(12) United States Patent
Takata et al.

(10) Patent No.: US 7,697,692 B2
(45) Date of Patent: Apr. 13, 2010

(54) CRYPTOGRAPHIC COMMUNICATION SYSTEM AND METHOD

(75) Inventors: Osamu Takata, Tokyo (JP); Takahiro Fujishiro, Yokohama (JP); Tadashi Kaji, Yokohama (JP); Kazuyoshi Hoshino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1081 days.

(21) Appl. No.: 11/363,510

(22) Filed: Feb. 28, 2006

(65) Prior Publication Data

US 2006/0204003 A1 Sep. 14, 2006

(30) Foreign Application Priority Data

Feb. 28, 2005 (JP) ............................. 2005-052737

(51) Int. Cl.
*G06F 21/00* (2006.01)
*H04L 9/14* (2006.01)

(52) U.S. Cl. ........................................ 380/277; 713/171

(58) Field of Classification Search ................ 380/277, 380/286, 44, 255, 283, 258, 281; 713/171, 713/194, 193, 176, 189, 155; 726/1, 10, 726/9, 12
See application file for complete search history.

(56) References Cited

U.S. PATENT DOCUMENTS

| | | | |
|---|---|---|---|
| 5,481,610 A | | 1/1996 | Doiron et al. |
| 5,574,785 A | | 11/1996 | Ueno et al. |
| 5,937,066 A | * | 8/1999 | Gennaro et al. ............. 380/286 |
| 6,073,242 A | * | 6/2000 | Hardy et al. .................... 726/1 |
| 6,278,783 B1 | * | 8/2001 | Kocher et al. ............... 380/277 |
| 6,298,442 B1 | * | 10/2001 | Kocher et al. ............... 713/194 |
| 6,327,661 B1 | * | 12/2001 | Kocher et al. ............... 713/193 |

(Continued)

FOREIGN PATENT DOCUMENTS

JP 07-327029 12/1995

(Continued)

OTHER PUBLICATIONS

RFC/STD/FYI/BCP Archives, "RFC 3740—The Multicast Group Security Architecture", URL: http://www.faqs.org/rfcs/rfc3740.html.

(Continued)

*Primary Examiner*—Gilberto Barron, Jr.
*Assistant Examiner*—Soheila Davanlou
(74) *Attorney, Agent, or Firm*—McDermott Will & Emery LLP

(57) ABSTRACT

Cryptographic communication between communication terminals can be realized even when a plurality of cryptographic algorithms are present, and secure cryptographic communication for a longer time is realized without increasing a processing overhead at each of the communication terminals. A key management server manages cryptographic algorithms that can be used by each of the communication terminal, and searches for a cryptographic algorithm common to the communication terminals, and notifies each of the communication terminals of the cryptographic algorithm found by the search together with plural key generation informations, each piece containing a key to be used in the cryptographic algorithm or a key type for generating the key. Each of the communication terminals sequentially switches the plural key generation informations notified from the key management server, and performs the cryptographic communication with a communication counterpart in accordance with the cryptographic algorithm notified from the key management server.

9 Claims, 18 Drawing Sheets

U.S. PATENT DOCUMENTS

| | | | |
|---|---|---|---|
| 7,318,160 B2 * | 1/2008 | Hopkins et al. | 713/189 |
| 7,409,543 B1 * | 8/2008 | Bjorn | 713/155 |
| 2001/0053220 A1 * | 12/2001 | Kocher et al. | 380/29 |
| 2002/0021804 A1 * | 2/2002 | Ledzius et al. | 380/44 |
| 2002/0129255 A1 * | 9/2002 | Tsuchiyama et al. | 713/176 |
| 2002/0131601 A1 * | 9/2002 | Ninomiya et al. | 380/277 |
| 2006/0093149 A1 * | 5/2006 | Zhu et al. | 380/277 |

FOREIGN PATENT DOCUMENTS

| | | |
|---|---|---|
| JP | 2000-295209 | 10/2000 |
| JP | 2005-303485 | 10/2005 |
| JP | 2005-304093 | 10/2005 |

OTHER PUBLICATIONS

Anderson W et al., "Methods to Support Multiple Encryption Algorithms in a Trunked Radio System", vol. 30, Mar. 1997 pp. 132-133, XP000657391.

Hardjono Verisign B Weis Cisco T, "The Multicast group Security Architecture; rfc3740.txt", Mar. 2004, pp. 8-12, XP015009520.

Search Report dated Jun. 19, 2006.

* cited by examiner

FIG. 3

COMMUNICATION CONDITION STORAGE UNIT 107

| TERMINAL URI | ALGORITHM ID | KEY LENGTH |
|---|---|---|
| 8.7.6.5.4.3.2.1.3.1.8.e64.ip | 01 | 64 |
| 8.7.6.5.4.3.2.1.3.1.8.e64.ip | 01 | 128 |
| 8.7.6.5.4.3.2.1.3.1.8.e64.ip | 02 | 128 |
| 8.7.6.5.4.3.2.1.3.1.8.e64.ip | 05 | 128 |
| 1.2.3.4.4.3.2.1.3.1.8.e64.ip | 01 | 128 |
| 1.2.3.4.4.3.2.1.3.1.8.e64.ip | 02 | 64 |
| 8.7.6.5.4.3.2.1.3.1.8.e64.ip | 03 | 128 |
| ⋮ | ⋮ | ⋮ |

FIG. 4

URI-IP CONVERSION TL 110

| URI | IP ADDRESS |
|---|---|
| 8.7.6.5.4.3.2.1.3.1.8.e64.ip | 192.16.8.0.55 |
| 1.2.3.4.4.3.2.1.3.1.8.e64.ip | 192.16.8.0.10 |
| 3.5.8.5.1.3.9.4.3.1.8.e64.ip | 192.16.8.0.30 |
| ⋮ | ⋮ |

KEY INVALIDATION REQUEST MESSAGE

VALIDATION SERVER 2

FIG. 9

COMMUNICATION CONDITION STORAGE UNIT 305

| ALGORITHM ID | KEY LENGTH |
|---|---|
| 01 | 64 |
| 01 | 128 |
| 02 | 64 |
| 02 | 128 |
| 03 | 128 |
| ⋮ | ⋮ |

COMMUNICATION CONDITION
REGISTRATION REQUEST MESSAGE

3041 / 3042

| TERMINAL URI | ALGORITHM ID : 01 KEY LENGTH : 64 | ALGORITHM ID : 01 KEY LENGTH : 128 | ------ | ALGORITHM ID ** KEY LENGTH : 128 |

FIG. 11

COMMON CONDITION STORAGE UNIT 307

| COMMUNICATION COUNTERPART URI | COMMUNICATION COUNTERPART IP ADDRESS | ALGORITHM ID | KEY LENGTH | VALIDITY PERIOD | KEY ID | KEY OR KEY TYPE |
|---|---|---|---|---|---|---|
| 8.7.6.5.4.3.2.1.3.1.8.e64.ip | 192.16.8.0.55 | 01 | 128 | 05.2.11.14:00.00~ 05.2.11.15:00.00 | 01 | ********* |
| 8.7.6.5.4.3.2.1.3.1.8.e64.ip | 192.16.8.0.55 | 01 | 128 | 05.2.11.15:00.00~ 05.2.11.16:00.00 | 02 | ********* |
| … | … | … | … | … | … | … |

3071　3072　3073　3074　3075　3076　3077

3070

COMMON CONDITION REQUEST MESSAGE

KEY UPDATE REQUEST MESSAGE

CRYPTOGRAPHIC COMMUNICATION SYSTEM AND METHOD

INCORPORATION BY REFERENCE

This application claims priority based on a Japanese patent application, No. 2005-052737 filed on Feb. 28, 2005, the entire contents of which are incorporated herein by reference.

BACKGROUND OF THE INVENTION

The present invention relates to a cryptographic communication technique, in particular, a technique of enabling communication terminals to perform cryptographic communication on a cryptographic communication network on which a plurality of cryptographic algorithms are available.

Japanese Patent Laid-open Publication No. H7-327029 (hereinafter, referred to as Document 1) discloses an cryptographic communication system having a plurality of cryptographic keys selectively used for enciphering data. In the enciphered communication system described in Document 1, a transmitter has a cryptographic key table recorded with a plurality of cryptographic keys, appendant data affixing means which affixes some appendant data to data to be encrypted, and means which sequentially selects the cryptographic keys from the cryptographic key table to encipher data, to which the appendant data is affixed, by using the selected cryptographic keys. On the other hand, a receiver includes the same cryptographic key table as that of the transmitter, decrypting means which selects the cryptographic key from the cryptographic key table and decrypts the encrypted data with the selected cryptographic key, appendant data detecting means which detects the appendant data from the decrypted data, and cryptographic key changing means which sequentially changes the cryptographic key to be selected from the cryptographic key data when the appendant data is not accurately detected. With such a configuration, when the cryptographic key is changed or the like, the reception side can restore data by itself even if the cryptographic key number is not correctly transmitted.

Japanese Patent Laid-open Publication No. 2000-295209 (hereinafter, referred to as Document 2) also discloses a cryptographic communication system having a plurality of encryption keys selectively used for encrypting data as in the Document 1. In the cryptographic communication system described in the Document 2, a communication terminal on a transmission side uses any one of encryption keys to generate encryption data and counts the number of times of use of the encryption key. When the accumulated count reaches the limit of the allowable number of times of use, the communication terminal switches the encryption key to another one and notifies a communication terminal on the reception side of switching information of the encryption key. On the other hand, the communication terminal on the reception side uses any one of a plurality of decryption keys respectively corresponding to the plurality of encryption keys. Upon reception of the switching information from the communication terminal on the transmission side, the communication terminal on the reception side switches the decryption key actually in use to another decryption key corresponding to the new encryption key. With such a configuration, as compared with the case where only one key is prepared, it becomes difficult to decrypt encrypted data by a key brute force attack or a known plaintext attack. Furthermore, since the plurality of keys are prepared, it is not necessary to create a new key for each encryption.

In Internet RFC/STD/FYI/BCP Archives, "RFC 3740—The Multicast Group Security Architecture", URL: http://www.faqs.org/rfcs/rfc3740.html (hereinafter, referred to as Document 3), a technique of sharing keys and setting information (Security Association) for cryptographic communication between a plurality of terminals is disclosed. In this technique, a server distributes the keys and the setting information for the cryptographic communication to the plurality of terminals.

SUMMARY OF THE INVENTION

In the techniques described in the Documents 1 and 2, prior to cryptographic communication, an authentication processing is required to be performed between the communication terminals performing the cryptographic communication so as to exchange a plurality of encryption keys. Therefore, a processing overhead at the communication terminal is disadvantageously high.

On the other hand, according to the technique described in the Document 3, since the server distributes the plurality of keys to each of the communication terminals which perform the cryptographic communication, it is not necessary for the communication terminals to exchange the keys. Thus, as compared with the technique described in the Documents 1 and 2, a processing overhead at the communication terminal can be reduced.

However, the technique described in the Document 3 does not give consideration to the presence of a plurality of cryptographic algorithms. When a cryptographic algorithm and a key length used by the communication terminal on the transmission side differ from those used by the communication terminal on the reception side, both the communication terminals cannot use the key or the setting information distributed by the server in some cases.

The present invention has been made in view of the above problems, and therefore realizes cryptographic communication between communication terminals even with the presence of a plurality of cryptographic algorithms, which is secure for a longer period of time without increasing a processing overhead at each of the communication terminals.

The present invention is characterized in that a management server manages, for each communication terminal, cryptographic algorithms that can be used by the communication terminal or a key length of the cryptographic algorithm. The cryptographic algorithm herein means information which specifies an encryption/decryption processing (for example, an encryption/decryption program) such as the order of various conversion processings including permutation, transliteration, substitution, division, and a shift operation. The management server searches for a cryptographic algorithm and a key length common to the communication terminals performing the cryptographic communication so as to notify each of the communication terminals performing the cryptographic communication the searched cryptographic algorithm together with plural pieces of key generation information for generating keys to be used in the cryptographic algorithm. On the other hand, each of the communication terminals performing the cryptographic communication sequentially switches the plural pieces of key generation information notified from the management server so as to perform the cryptographic communication with a communication counterpart using the cryptographic algorithm notified from the management server.

For example, the present invention provides a cryptographic communication system including:

a plurality of communication terminals which perform cryptographic communication;

and a management server which manages a communication condition of each of the plurality of communication terminals, in which each of the communication terminals includes:

a plurality of encryption/decryption processing means, for which different cryptographic algorithms are respectively used;

common condition requesting means which transmits a common condition request to the management server, the common condition request containing a terminal ID corresponding to identification information of a self communication terminal and a terminal ID of another one of the communication terminals which corresponds to a communication destination terminal;

common condition storing means which stores common condition information containing a terminal ID of a communication source terminal, the terminal ID of the communication destination terminal, an algorithm ID corresponding to identification information of the cryptographic algorithm that can be used by both the communication source terminal and the communication destination terminal, and plural pieces of key generation information;

common condition obtaining means which receives the common condition information from the management server and stores the received common condition information in the common condition storing means, the common condition information containing the terminal ID of the self communication terminal which is identical with any of the terminal ID of the communication source terminal and the terminal ID of the communication destination terminal; and cryptographic communication means which searches the common condition storing means for the common condition information having a terminal ID of a communication counterpart, selects, from the plurality of encryption/decryption processing means, the encryption/decryption processing means, for which the cryptographic algorithm having the algorithm ID contained in the common condition information found in the search is used, and uses the selected encryption/decryption processing means to perform the cryptographic communication with the communication terminal of the communication counterpart, the management server includes:

communication condition storing means which stores, for each of the plurality of communication terminals, communication condition information containing the terminal ID of the communication terminal and the algorithm ID of each of the cryptographic algorithms respectively used for the plurality of encryption/decryption processing means provided for the communication terminal;

common condition request receiving means which receives a common condition request from the communication terminal;

common condition search means which searches the common condition storing means for the algorithm ID and a key length which are contained in both the communication condition information containing the terminal ID of the communication source terminal issuing the common condition request received by the common condition request receiving means and the common condition information containing the terminal ID of the communication destination terminal to which the common condition request is sent;

key generation information generating means which generates plural pieces of key generation information, each containing the key length key used in the encryption/decryption processing means for which the cryptographic algorithm having the algorithm ID retrieved by the common condition search means is used, or a key type for generating the key, and a key ID corresponding to identification information; and common condition transmission means which transmits common condition information to each of the communication terminals, the common condition information containing: the terminal ID of the communication source terminal and the terminal ID of the communication destination terminal in the common condition request received by the common condition request receiving means; the algorithm ID retrieved by the common condition search means; and the plural pieces of key generation information generated by the key generation information generating means in response to the common condition request, the communication terminals each having the terminal ID of the communication source terminal issuing the common condition request and the communication terminal having the terminal ID of the communication destination terminal to which the common condition request is sent, and the cryptographic communication means of the communication terminal sequentially selects the key generation information from the plural pieces of key generation information contained in the common condition information retrieved by the search, uses the key contained in the selected key generation information or the key generated from the key type contained in the key generation information to cause the selected encryption/decryption processing means to generate encrypted data, and transmits cryptographic communication information containing the encrypted data and the key ID contained in the selected key generation information to a communication counterpart, while selecting the key generation information having the key ID contained in the cryptographic communication information received from the communication counterpart from the plural pieces of key generation information contained in the common condition information retrieved by the search and using the key contained in the selected key generation information or the key generated from the key type contained in the key generation information to cause the selected encryption/decryption processing means to decrypt the encrypted data contained in the cryptographic communication information received from the communication counterpart.

According to the present invention, even if a plurality of cryptographic algorithms are available, cryptographic communication can be realized between communication terminals. Also cryptographic communication that is secure for a longer time without increasing a processing overhead at each of the communication terminals.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a view for explaining an example of contents registered in a communication condition storage unit 107;

FIG. 4 is a view for explaining an example of contents registered in a URI-IP management TL 110;

FIG. 9 is a view showing an example of contents registered in a communication condition storage unit 305;

FIG. 10 is a view schematically showing a communication condition registration request message;

FIG. 11 is a view for explaining an example of contents registered in a common condition storage unit 307;

DETAILED DESCRIPTION OF THE EMBODIMENTS

Figure 1:
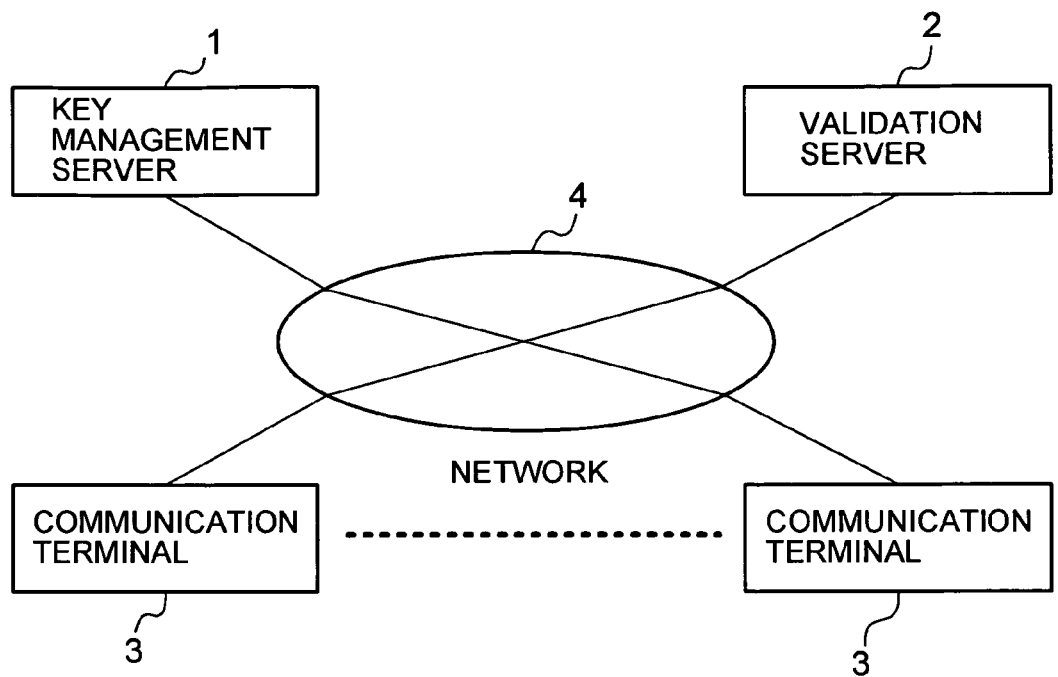
FIG. 1 is a schematic configuration view of a cryptographic communication system to which an embodiment of the present invention is applied.

FIG. 1 is a schematic configuration view of a cryptographic communication system to which an embodiment of the present invention is applied. As illustrated, the cryptographic communication system according to this embodiment includes a key management server 1, a validation server 2, and a plurality of communication terminals 3 performing cryptographic communication, which are interconnected through a network 4 such as the Internet.

First, the key management server 1 will be described. For each of the communication terminals 3, the key management server 1 manages cryptographic algorithms that can be used by the communication terminal 3. The cryptographic algorithm herein means information for specifying an encryption/decryption processing (for example, an encryption/decryption program) such as the order of various conversion processings including permutation, transliteration, substitution, division, and a shift operation. The cryptographic algorithm is represented by, an AES (Advanced Encryption Standard) and the like. The key management server 1 searches for a cryptographic algorithm common to the communication terminals 3 performing the cryptographic communication so as to notify each of the communication terminals 3 performing the cryptographic communication of the cryptographic algorithm retrieved by the search together with plural pieces of key generation information, each containing one of a key and a key type used in the cryptographic algorithm, and information of a communication counterpart. Herein, the key type is information based on which the key is generated. Each of the communication terminals 3 has a common rule to generate a key from the key type. Therefore, the same key is generated from the same key type in each of the communication terminals 3.

Figure 2:
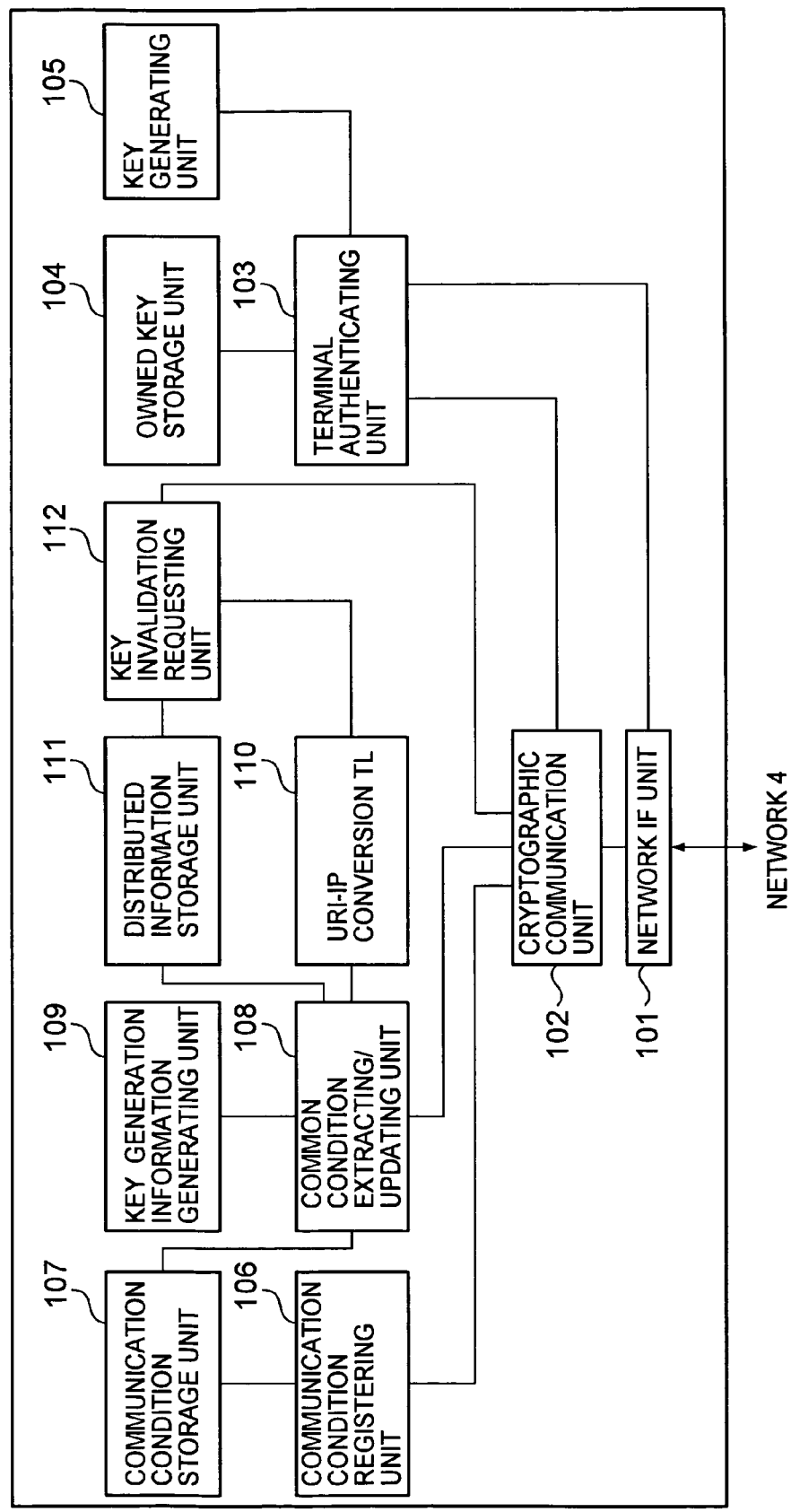
FIG. 2 is a schematic configuration view of a key management server 1 shown in FIG. 1.

FIG. 2 is a schematic configuration view of the key management server 1 shown in FIG. 1.

As illustrated, the key management server 1 includes a network IF (interface) unit 10 for connection to the network 4, a cryptographic communication unit 102, a terminal authenticating unit 103, an owned key storage unit 104, a key generating unit 105, a communication condition registering unit 106, a communication condition storage unit 107, a common condition extracting/updating unit 108, a key generation information generating unit 109, a URI-IP conversion TL (table) 110, a distributed information storage unit 111, and a key invalidation requesting unit 112.

The cryptographic communication unit 102 uses an encryption key notified from the terminal authenticating unit 103 so as to perform the cryptographic communication through the network IF unit 101 with the communication terminal 3 having an IP address notified from the terminal authenticating unit 103 together with the encryption key in accordance with the cryptographic algorithm (for example, an encryption/decryption program) predefined with each of the communication terminals 3.

The owned key storage unit 104 stores a secret key of the key management server 1 and a public key certificate paired with the public key.

The key generating unit 105 generates an encryption key to be used by the cryptographic communication unit 102 for the cryptographic communication with the communication terminal 3.

In response to an authentication request received from the communication terminal 3 through the network IF unit 101, the terminal authenticating unit 103 performs an authentication processing for the communication terminal 3 issuing the authentication request. When the communication terminal 3 is authenticated, the terminal authentication unit 103 causes the key generating unit 105 to generate an encryption key and uses the secret key of the key management server 1 stored in the owned key storage unit 104 to generate a digital signature. Then, the terminal authentication unit 103 transmits an authentication response containing the generated encryption key, the digital signature, and the public key certificate of the key management server 1, to the communication terminal 3 and sets the encryption key and the IP address of the communication terminal 3 in the cryptographic communication unit 102.

The communication condition registering unit 106 stores a communication condition contained in a communication condition registration request message, which is received from the communication terminal 3 through the network IF unit 101 and the cryptographic communication unit 102, in association with identification information (terminal ID) of the communication terminal 3 in the communication condition storage unit 107. The communication condition herein indicates information for specifying the combination of a cryptographic algorithm and a key length, which is available in the corresponding communication terminal 3.

FIG. 3 is a view for explaining an example of the contents registered in the communication condition storage unit 107. In this example, an URI (Uniform Resource Identifier) of the communication terminal 3 is used as the terminal ID. As illustrated, one record 1070 is formed to include a field 1071 which registers a terminal URI corresponding to the terminal ID, a field 1082 which registers an algorithm ID of the cryptographic algorithm, and a field 1073 which registers the key length.

In the URI-IP conversion TL 110, a relation between the terminal URI and the IP address of the communication terminal 3 is stored for each of the communication terminals 3. FIG. 4 is a view for explaining an example of the contents registered in the URI-IP management TL 110. As illustrated, one record 1100 is formed to include a field 1101 which registers the terminal URI and a field 1102 which registers the IP address.

In response to a key generation request from the common condition extracting/updating unit 108, the key generation information generating unit 109 generates plural pieces of key generation information with a validity period, each including the encryption key to be used by the communication terminal 3 for the cryptographic communication with another one of the communication terminals 3 or the key type for generating the encryption key, together with a key ID corresponding to identification information.

Upon reception of a common condition request message described below from the communication terminal 3 through the network IF unit 101 and the cryptographic communication unit 102, the common condition extracting/updating unit 108 searches for, by using the communication condition storage unit 107, the combination of the algorithm ID and the key length common to the communication terminal 3 having the terminal URI of a communication source terminal and the communication terminal 3 having the terminal URI of a communication destination terminal, which are contained in the common condition request message. Moreover, the common condition extracting/updating unit 108 causes the key generation information generating unit 109 to generate a plurality of keys, each having the key length in the combination retrieved by the search, or plural pieces of key generation information with a validity period for generating the keys. Furthermore, the common condition extracting/updating unit 108 uses the URI-IP conversion TL 110 to specify an IP address corresponding to the terminal URI of the communication source terminal and an IP address corresponding to the terminal URI of the communication destination terminal, which are contained in the common condition request message. Then, the common condition extracting/updating unit 108 generates common condition distribution information containing the terminal URI and the IP address of the communication source terminal, the terminal URI and the IP address of the communication destination terminal, the combination of the algorithm ID and the key length retrieved by the search, and the plural pieces of key generation information generated by the key generation information generating unit 109.

Upon reception of a key update request message described below from the communication terminal 3 through the network IF unit 101 and the cryptographic communication unit 102, the common condition extracting/updating unit 108 notifies the key generation information generating unit 109 of a key generation request which requires the designation of the algorithm ID, the key length, and a communication period contained in the key update request message so that the key generation information generating unit 109 generates plural pieces of key generation information with a validity period.

Moreover, the common condition extracting/updating unit 108 uses the URI-IP conversion TL 110 to specify an IP address corresponding to the communication source terminal URI and an IP address corresponding to the communication destination terminal URI, which are contained in the key update request message. Then, the common condition extracting/updating unit 108 generates common condition distribution information containing the terminal URI and the IP address of the communication source terminal, the terminal URI and the IP address of the communication destination terminal, and the algorithm ID and the key length contained in the key update request message, and the plural pieces of key generation information with the validity period generated by the key generation information generating unit 109, and transmits the common condition distribution information to each of the communication source terminal and the communication destination terminal through the cryptographic communication unit 102 and the network IF unit 101. The common condition extracting/updating unit 108 also stores the common condition distribution information as distributed information in the distributed information storage unit 111.

Figure 5:
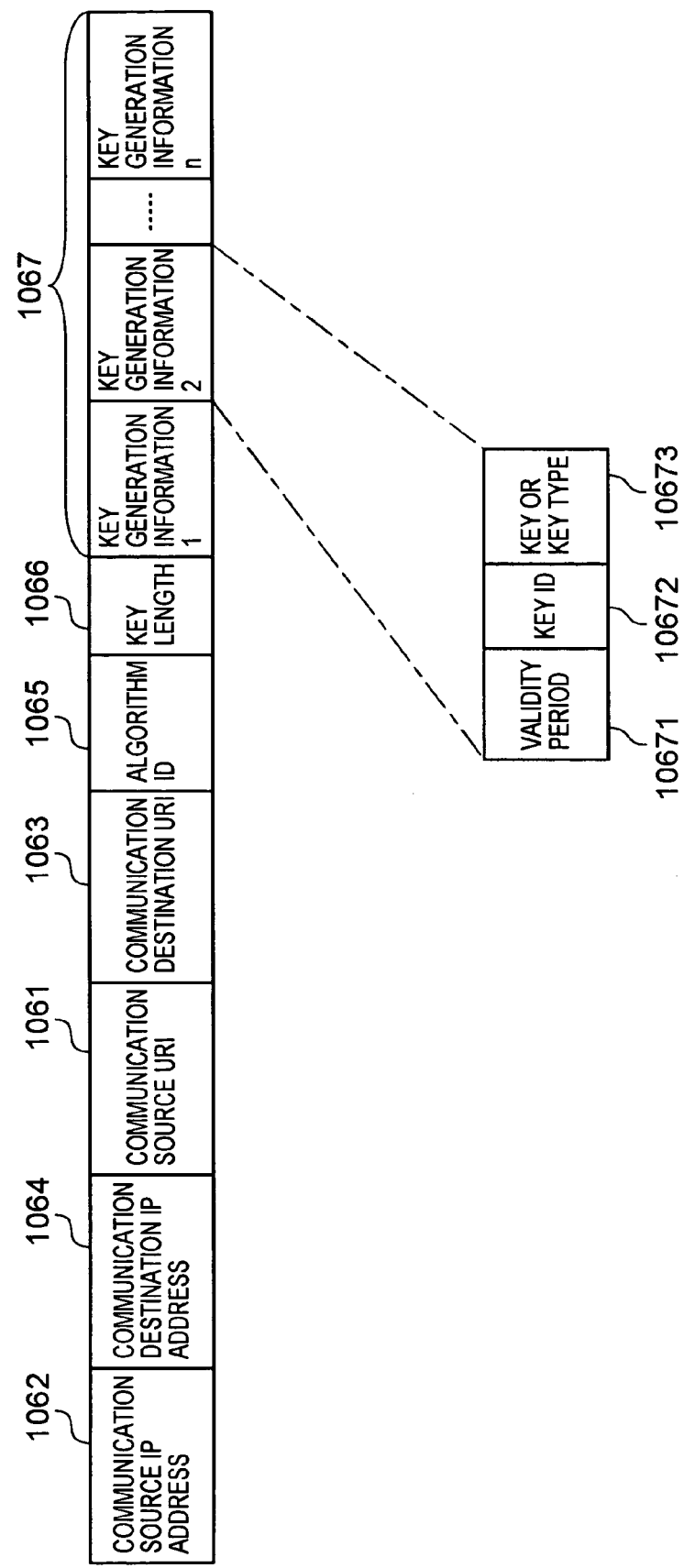
FIG. 5 is a view schematically showing common condition distribution information.

FIG. 5 is a view schematically showing the common condition distribution information. As illustrated, the common condition distribution information contains a terminal URI 1061 of the communication source terminal, an IP address 1062 of the communication source terminal, a terminal URI 1063 of the communication destination terminal, an IP address 1064 of the communication destination terminal, an algorithm ID 1065, a key length 1066, and plural pieces of key generation information 1067 with the validity period. The key generation information 1067 contains a validity period 10671, a key ID 10672, and a key or a key type 10673.

In response to a key invalidation instruction received from an operator of the key management server 1, the key invalidation requesting unit 112 reads out the distributed information containing the key generation information to be invalidated from the distributed information storage unit 111, and creates a key invalidation request message based on the distributed information. Then, the key invalidation requesting unit 112 transmits the key invalidation request message to each of the communication source terminal and the communication destination terminal through the cryptographic communication unit 102 and the network IF unit 101. Moreover, the key invalidation requesting unit 112 adds a flag (not shown), which indicates that key generation information is to be invalidated, to the key generation information to be invalidated stored in the distributed information storage unit 111.

Figure 6:
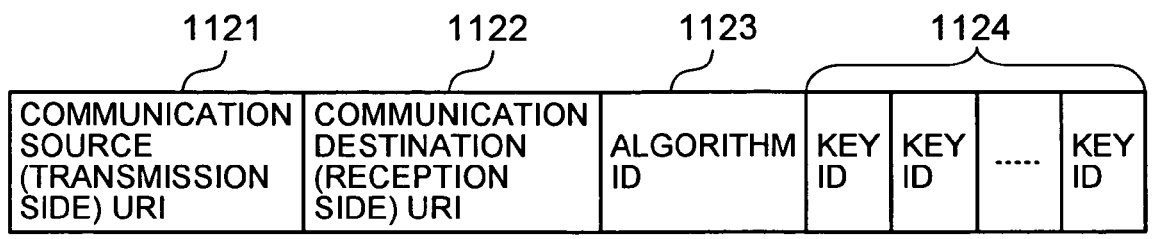
FIG. 6 is a view schematically showing a key invalidation request message.

FIG. 6 is a view schematically showing the key invalidation request message. As illustrated, the key invalidation request message contains a terminal URI 1121 of the communication source terminal, a terminal URI 1122 of the communication destination terminal, an algorithm ID 1123, and a key ID 1124 of at least one key generation information.

Next, the validation server 2 will be described. The validation server 2 temporarily stores revocation information of the public key certificate obtained from a certificate authority. In response to a request from the key management server 1, the validation server 2 verifies the public key certificate of the communication terminal 3 by using the revocation information.

Figure 7:
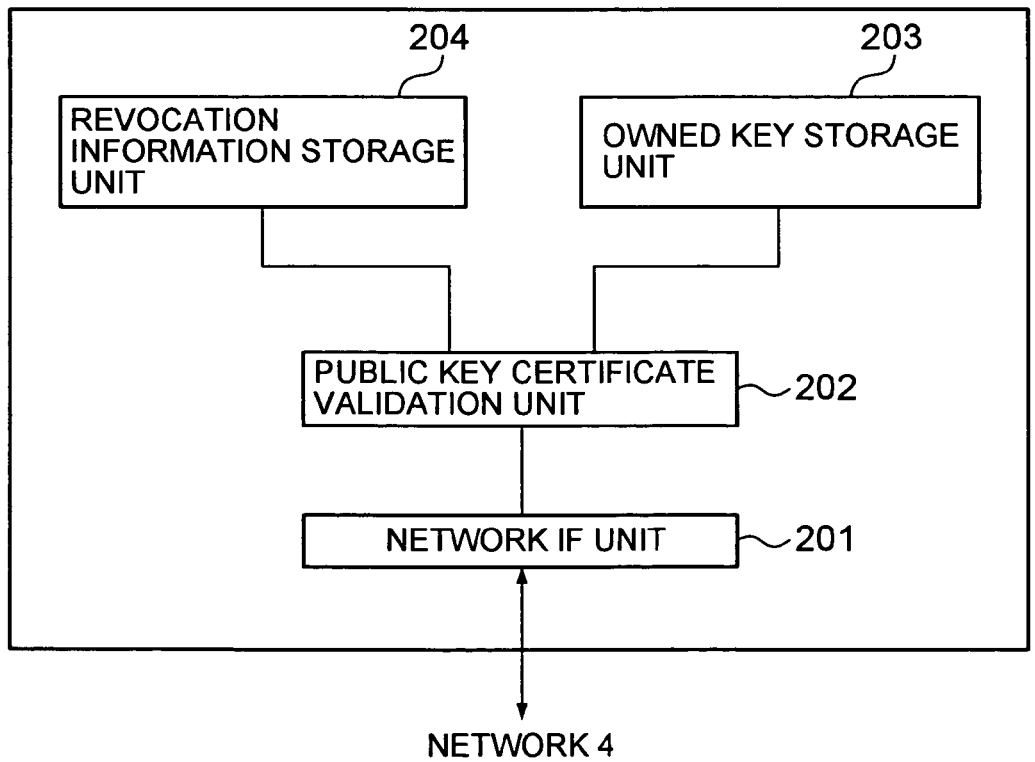
FIG. 7 is a schematic configuration view of a validation server 2 shown in FIG. 1.

FIG. 7 is a schematic configuration view of the validation server 2 shown in FIG. 1

As illustrated, the validation server 2 includes a network IF unit 201 for connection to the network 4, a public key certificate validation unit 202, an owned key storage unit 203, and a revocation information storage unit 204.

The owned key storage unit 203 stores the secret key of the validation server 2 and the public key certificate paired with the secret key.

The revocation information storage unit 204 temporarily stores the revocation information of the public key certificate issued from a certificate authority (not shown) to each of the communication terminals 3.

The public key certificate validation unit 202 judges, by using the revocation information storage unit 204, the validity of the public key certificate of the communication terminal 3, which is contained in the validation request received from the key management server 1 through the network IF unit 201. Moreover, the public key certificate validation unit 202 generates a digital signature for the result of judgment of the validity by using the secret key of the validation server 2, which is stored in the owned key storage unit 203. Then, the public key certificate validation unit 202 returns the result of verification, which contains the result of judgment of the validity, the digital signature, and the public key certificate of the validation server 2 stored in the owned key storage unit 203, to the key management server 1.

Next, the communication terminal 3 will be described. The communication terminal 3 sequentially switches a plurality of keys contained in the plural pieces of key generation information notified from the key management server 1 or a plurality of keys generated from the plurality of key types contained in the plural pieces of key generation information and performs the cryptographic communication with a communication counterpart notified from the key management server 1 in accordance with the cryptographic algorithm notified from the key management server 1.

Figure 8:
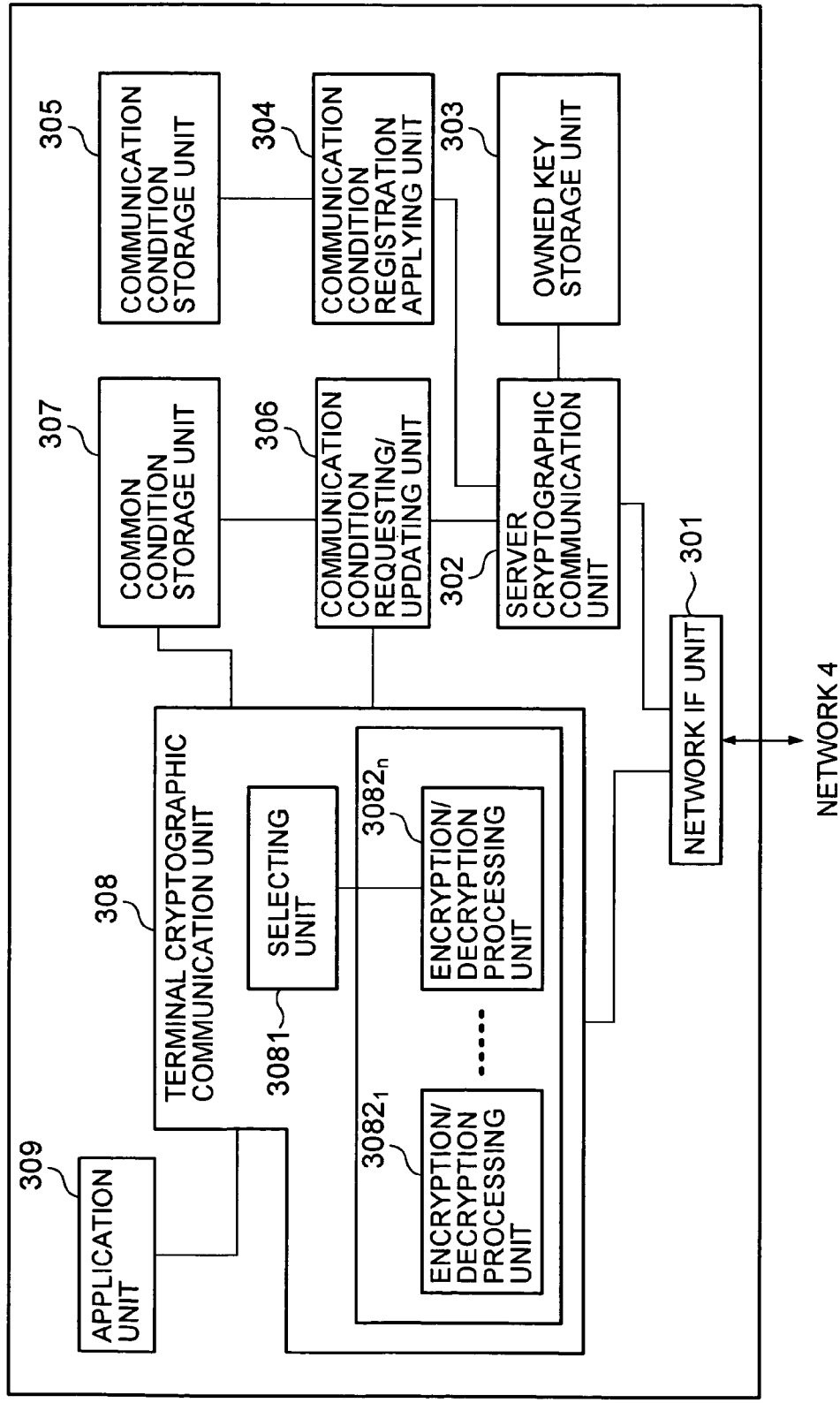
FIG. 8 is a schematic configuration view of a communication terminal 3 shown in FIG. 1.

FIG. 8 is a schematic configuration view of the communication terminal 3 shown in FIG. 1.

As illustrated, the communication terminal 3 includes a network IF unit 301 for connection to the network 4, a server cryptographic communication unit 302, an owned key storage unit 303, a communication condition registration applying unit 304, a communication condition storage unit 305, a common condition requesting/updating unit 306, a common condition storage unit 307, a terminal cryptographic communication unit 308, and an application unit 309 which transmits and receives data to/from another one of the communication terminals 3.

The owned key storage unit 303 stores a secret key of the self communication terminal 3 and a public key certificate paired with the secret key.

In response to an instruction from the communication condition registration applying unit 304 described below, the common condition requesting unit 306, or the key management server 1, the server cryptographic communication unit 302 shares the encryption key with the key management server 1 and performs the cryptographic communication with the key management server 1 by using the encryption key in accordance with the cryptographic algorithm predefined with the key management server 1.

The communication condition storage unit 305 stores a communication condition (the combination of a cryptographic algorithm and a key length) available for the cryptographic communication with another one of the communication terminals 3. FIG. 9 is a view showing an example of the contents registered in the communication condition storage unit 305. As illustrated, one record 3050 is formed to include a field 3051 which registers the algorithm ID and a field 3052 which registers the key length.

In response to an instruction from an operator of the self communication terminal 3 or an instruction from the application unit 309, the communication condition registration applying unit 304 generates a communication condition registration request message containing the combinations of algorithm IDs and key lengths stored in the communication condition storage unit 305 and the terminal URI of the self communication terminal 3, and then transmits the thus generated communication condition registration request message to the key management server 1 through the server cryptographic communication unit 302 and the network IF unit 301.

FIG. 10 is a view schematically showing the communication condition registration request message. As illustrated, the communication condition registration request message contains a terminal URI 3041 of the self communication terminal, and at least one communication condition (a combination of the algorithm ID and the key length) 3042.

The common condition storage unit 307 stores a communication condition when the cryptographic communication is performed with another one of the communication terminals 3 corresponding to a communication counterpart. FIG. 11 is a view for explaining an example of the contents registered in the common condition storage unit 307. As illustrated, one record 3070 is formed to include a field 3071 which registers the terminal URI of the communication terminals 3 corresponding to the communication counterpart of the cryptographic communication, a field 3072 which registers the IP address of the communication terminal 3 corresponding to the communication counterpart of the cryptographic communication, a field 2073 which registers the algorithm ID, a field 3074 which registers the key length, a field 3075 which registers the validity period, a field 3076 which registers the key ID, and a field 3077 which registers the key generation information.

In response to an instruction from the terminal cryptographic communication unit 308, the common condition requesting/updating unit 306 creates a common condition request message or a key update request message so as to obtain a common condition for the cryptographic communication with the communication terminal 3 corresponding to the communication counterpart or the updated key generation information used for the common condition from the key management server 1, and then transmits the thus created common condition request message or key update request message to the key management server 1 through the server cryptographic communication unit 302 and the network IF unit 301.

Figure 12A:
FIG. 12A is a view schematically showing a common condition request message.
Figure 12B:
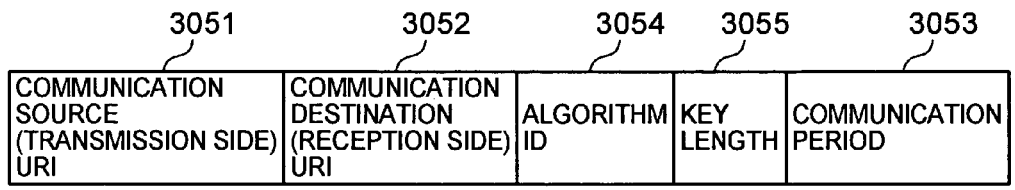
FIG. 12B is a view schematically showing a key update request message.

FIG. 12A is a view schematically showing the common condition request message, and FIG. 12B is a view schematically showing the key update request message. As illustrated, the common condition request message contains a terminal URI 3051 of the self communication terminal 3 corresponding to the communication source terminal, a terminal URI 3052 of the communication terminal 3 corresponding to the communication destination terminal, and a communication period 3053 during which the cryptographic communication to be performed. The key update request message contains the terminal URI 3051 of the self communication terminal 3 corresponding to the communication source terminal, the terminal URI 3052 of the communication terminal 3 corresponding to the communication destination terminal, an algorithm ID 3054, a key length 3055, and the communication period 3053 during which the cryptographic communication to be performed.

Upon reception of the common condition distribution information from the key management server 1 through the network IF unit 301 and the server cryptographic communication unit 302, the communication condition requesting/ updating unit 306 registers the common condition distribution information into the common condition storage unit 307.

Moreover, upon reception of the key invalidation request message containing the terminal URL of the self communication terminal 3 registered in any one of the source URI 1121 and the destination URI 1122 from the key management server 1 through the network IF unit 301 and the server cryptographic communication unit 302, the communication condition requesting/updating unit 306 deletes the record 3070 from the common condition storage unit 307 in accordance with the key invalidation request message.

The communication condition requesting/updating unit 306, for example, regularly monitors the common condition storage unit 307 so as to delete the record 3070 whose validity period registered in the field 3075 has expired from the common condition storage unit 307.

The terminal cryptographic communication unit 308 uses the cryptographic algorithm and the encryption key shared with the communication terminal 3 corresponding to the communication counterpart so as to decrypt encrypted data received from the communication terminal 3 corresponding to the communication counterpart through the network IF unit 301, and then outputs the result of decryption to the application unit 309. Moreover, the terminal cryptographic communication unit 308 uses the cryptographic algorithm and the encryption key shared with the communication terminal 3 corresponding to the communication counterpart to encrypt the data received from the application unit 309, and then transmits the encrypted data to the communication terminal 3 corresponding to the communication counterpart through the network IF unit 301.

As illustrated in FIG. 8, the terminal cryptographic communication unit 308 includes a plurality of encryption/decryption processing units $3082_1$ to $3082_n$ (also referred to simply as an encryption/decryption processing units 3082) and a selecting unit 3081. The plurality of encryption/decryption processing units $3082_1$ to $3082_n$ respectively perform encryption/decryption processings in accordance with different cryptographic algorithms.

Each of the plurality of encryption/decryption processing units $3082_1$ to $3082_n$ is related with an algorithm ID of the cryptographic algorithm used for the encryption/decryption processing.

The selecting unit 3081 selects the encryption/decryption processing units (the encryption/decryption processing unit for transmission and the encryption/decryption processing unit for reception) used for the cryptographic communication with the communication terminal 3 corresponding to the communication counterpart from the plurality of encryption/decryption processing units $3082_1$ to $3082_n$, and sets an encryption key used for the cryptographic communication with the communication terminal 3 corresponding to the communication counterpart in the selected encryption/decryption processing units 3082.

When the record 3070 including the field 3071 registered with the terminal URI of the communication terminal 3 corresponding to the communication counterpart, with which the cryptographic communication is to be performed, is not registered in the common condition storage unit 307, the selecting unit 3081 notifies the common condition requesting/updating unit 306 of the terminal URI of the communication terminal 3 corresponding to the communication counterpart and the communication period predefined by, for example, an operator of the self communication terminal 3, and instructs the common condition requesting/updating unit 306 to transmit the common condition request message to the key management server 1.

Alternatively, when a time period from the current time to an end time of the validity period of the record 3070 whose validity period expires last, which includes the field 3071 registered with the terminal URI of the communication terminal 3 corresponding to the communication counterpart being in the cryptographic communication, becomes less than a predetermined period of time, the selecting unit 3081 notifies the common condition requesting/updating unit 306 of the terminal URI of the communication terminal corresponding to the communication counterpart, the algorithm ID and the key length registered in the fields 3073 and 3074 of the record 3070, and the communication period predefined by, for example, the operator of the self communication terminal 3, and instructs the common condition requesting/updating unit 306 to transmit the key update request message to the key management server 1.

When the encryption/decryption processing unit 3082 is selected as the encryption/decryption processing unit for transmission by the selecting unit 3081, the encryption/decryption processing unit 3082 encrypts the data received from the application unit 309 with the encryption key set for the encryption/decryption processing unit 3082 itself to generate encrypted data. After adding the key ID set for the encryption/decryption processing unit 3082 itself to the encrypted data, the encryption/decryption processing unit 3082 transmits the encrypted data with the key ID to the communication terminal 3 corresponding to the communication counterpart through the network IF unit 301.

When being selected as the encryption/decryption processing unit for reception by the selecting unit 3081, the encryption/decryption processing unit 3082 decrypts the encrypted data received from the communication terminal 3 corresponding to the communication counterpart through the network IF unit 301 with the encryption key set for the encryption/decryption processing unit 3082 itself, and passes the result of decryption as received data from the communication terminal 3 corresponding to the communication counterpart to the application unit 309.

Figure 13:
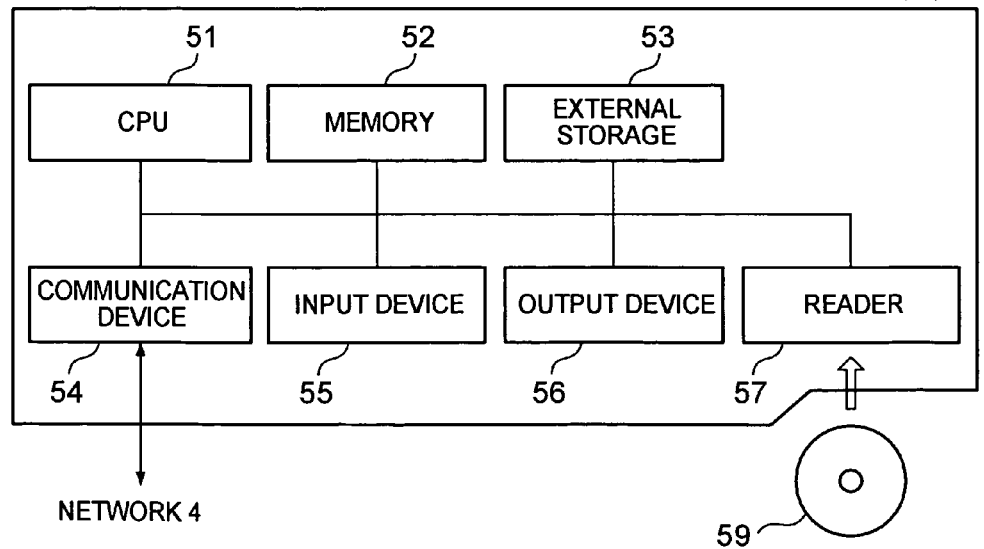
FIG. 13 is a view showing an example of a hardware configuration of the key management server 1, the validation server 2, and the communication terminal 3.

The key management server 1, the validation server 2, and the communication terminal 3 having the above-described configurations can be realized by execution of a predetermined program loaded on a memory 52 by a CPU 51 in a general computer. The general computer includes, as shown in FIG. 13, the CPU 51, the memory 52, an external storage 53 such as an HDD, a reader 57 for reading information from a portable storage medium 59 such as a CD-ROM, a DVD-ROM or an IC card, an input device 55 such as a keyboard or a mouse, an output device 56 such as a display, a communication device 54 for performing communication with a communication counterpart device through the network 4, and an internal communication line 58 for connecting the devices 51 to 57 to each other such as a bus. In this case, the memory 52 and the external storage 53 are used by various storage units, and the communication device 54 is used by the network IF unit.

The predetermined program may be downloaded from the recording medium 59 through the reader 57 or from a communication medium (in other words, the network 4, or a digital signal or a carrier wave propagating through the network 4) through the communication device 54 into the external storage 53, and then loaded on the memory 52 so as to be executed by the CPU 51. Alternatively, the predetermined program may be directly loaded onto the memory 52 from the recording medium 59 through the reader 57 or from the network 4 through the communication device 54 so as to be executed by the CPU 51.

Next, an operation of the cryptographic communication system having the above-described configuration will be described.

First, an authentication processing between the communication terminal 3 and the key management server 1 (a communication terminal-server authentication processing) will be described.

Figure 14:
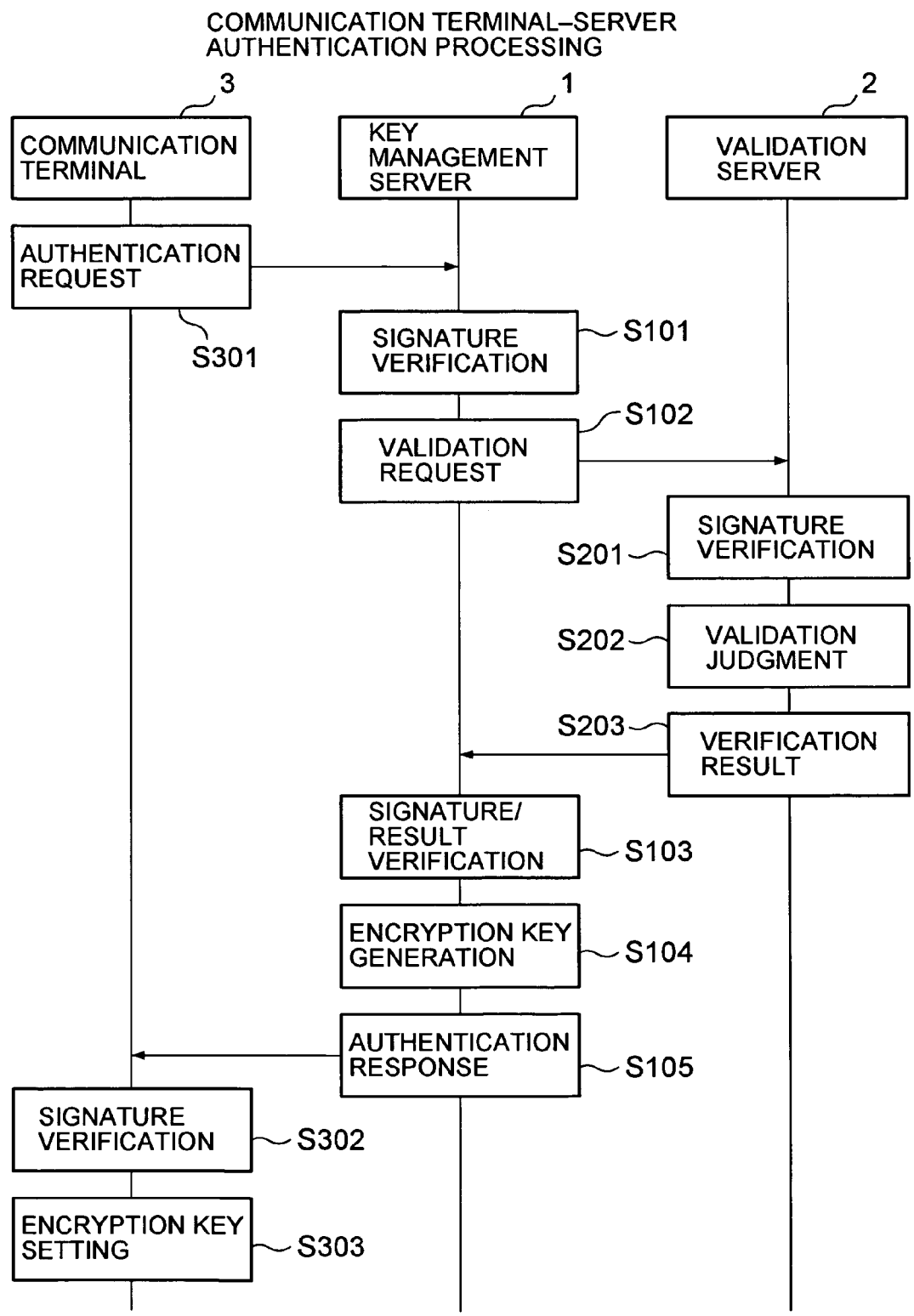
FIG. 14 is a view for explaining a communication terminal-server authentication processing.

FIG. 14 is a view for explaining the communication terminal-server authentication processing.

In the communication terminal 3, in response to an authentication request from the communication condition registration applying unit 304, the common condition requesting unit 306, or the key management server 1, the server cryptographic communication unit 302 uses the secret key stored in the owned key storage unit 303 to generate a digital signature for an arbitrary message. Then, the server cryptographic communication unit 302 generates an authentication request containing the message, the digital signature for the message, and the public key certificate stored in the owned key storage unit 303 so as to transmit the thus generated authentication request to the key management server 1 through the network IF unit 301 (S301).

In the key management server 1, upon reception of the authentication request from the communication terminal 3 through the network IF unit 101, the terminal authenticating unit 103 uses the public key certificate contained in the authentication request to verify the digital signature for the message contained in the authentication request (S101). When the digital signature is not validated, a predetermined error processing is performed by transmitting an error message to the communication terminal 3 or the like. On the other hand, when the digital signature is validated, the terminal authenticating unit 103 transmits a validation request of the public key certificate of the communication terminal 3, which is contained in the authentication request, to the validation server 2 through the network IF unit 101 so as to request the validation server 2 to judge the validity of the public key certificate (S102). More specifically, the terminal authenticating unit 103 uses the secret key of the key management server 1 stored in the owned key storage unit 104 to generate a digital signature for the validation request message of the public key certificate of the communication terminal 3. Then, the terminal authenticating unit 103 transmits a validation request containing the validation request message of the public key certificate of the communication terminal 3, the generated digital signature, and the public key certificate of the key management server 1 stored in the owned key storage unit 104 to the validation server 2.

In the validation server 2, upon reception of the validation request from the key management server 1 through the network IF unit 201, the public key certificate validation unit 202 verifies the digital signature for the validation request message of the public key certificate of the communication terminal 3, which is contained in the validation request, by using the public key certificate of the key management server 1 contained in the validation request (S201). When the digital signature is not validated, a predetermined error processing is performed by transmitting an error message to the key management server 1 or the like. On the other hand, when the digital signature is validated, the public key certificate validation unit 202 checks whether or not the revocation information of the public key certificate of the communication terminal 3, which is contained in the validation request, is stored in the revocation information storage unit 204 (S202). If not, it is judged that the public key certificate of the communication terminal 3 is valid. Otherwise, it is judged that the public key is not valid. Then, the public key certificate validation unit 202 uses the secrete key of the validation server 2 stored in the owned key storage unit 203 to generate a digital signature for the above-described result of judgment. The public key certificate validation unit 202 then returns a verification result, which contains the generated digital signature, the above-described result of judgment, and the public key certificate of the validation server 2 stored in the owned key storage unit 203, to the key management server 1 (S203).

In the key management server 1, upon reception of the verification result from the validation server 2 through the network IF unit 101, the terminal authenticating unit 103 uses the public key certificate of the validation server 2 contained in the verification result to verify the digital signature for the judgment result of the validation server 2 contained in the verification result and checks the judgment result of the validity contained in the verification result (S103). When the digital signature is not validated, the terminal authenticating unit 103 transmits an error message to the validation server 2 to perform a predetermined error processing. When the judgment result of the validity indicates no validity, the terminal authenticating unit 103 transmits an error message to the communication terminal 3 to perform a predetermined error processing. On the other hand, when the digital signature is validated and the judgment result of the validity indicates validity, the terminal authenticating unit 103 requests the key generating unit 105 to generate an encryption key used for the cryptographic communication with the communication terminal 3 that transmits the authentication request. In response to the request, the key generating unit 105 generates an encryption key (for example, a random number having a predetermined number of bits) (S104). Then, the terminal authenticating unit 103 uses the secret key of the key management server 1 stored in the owned key storage unit 104 to generate a digital signature for the encryption key generated by the key generating unit 105. The terminal authenticating unit 103 also uses the public key certificate of the communication terminal 3 contained in the authentication request to generate encrypted data of the encryption key. Then, the terminal authenticating unit 103 creates an authentication response containing the encrypted data of the encryption key, the digital signature for the encryption key, and the public key certificate of the key management server 1 stored in the owned key storage unit 104 to transmit the authentication response to the communication terminal 3 that transmits the authentication request through the network IF unit 101. The terminal authenticating unit 103 also sets the encryption key and the IP address of the communication terminal 3 in the cryptographic communication unit 102 (S105).

In the communication terminal 3, upon reception of the authentication response from the key management server 1 through the network IF unit 301, the server cryptographic communication unit 302 uses the secrete key stored in the owned key storage unit 303 to decrypt the encrypted data contained in the authentication response. The server cryptographic communication unit 302 also uses the result of decryption and the public key certificate of the key management server 1 contained in the authentication response to verify the digital signature contained in the authentication response (S302). When the digital signature is not validated, a predetermined error processing is performed by notifying an operator of the self communication terminal 3 of an error message or the like. On the other hand, when the digital signature is validated, the server cryptographic communication terminal 302 sets the result of decryption as an encryption key used for the cryptographic communication with the key management server 1 (S303). Thereafter, the encryption key is used to perform the cryptographic communication with the key management server 1.

Next, a processing, in which the key management server 1 responds to the common condition request message from the communication terminal 3 to distribute common condition distribution information (a common condition request message response common condition distribution processing), will be described.

Figure 15:
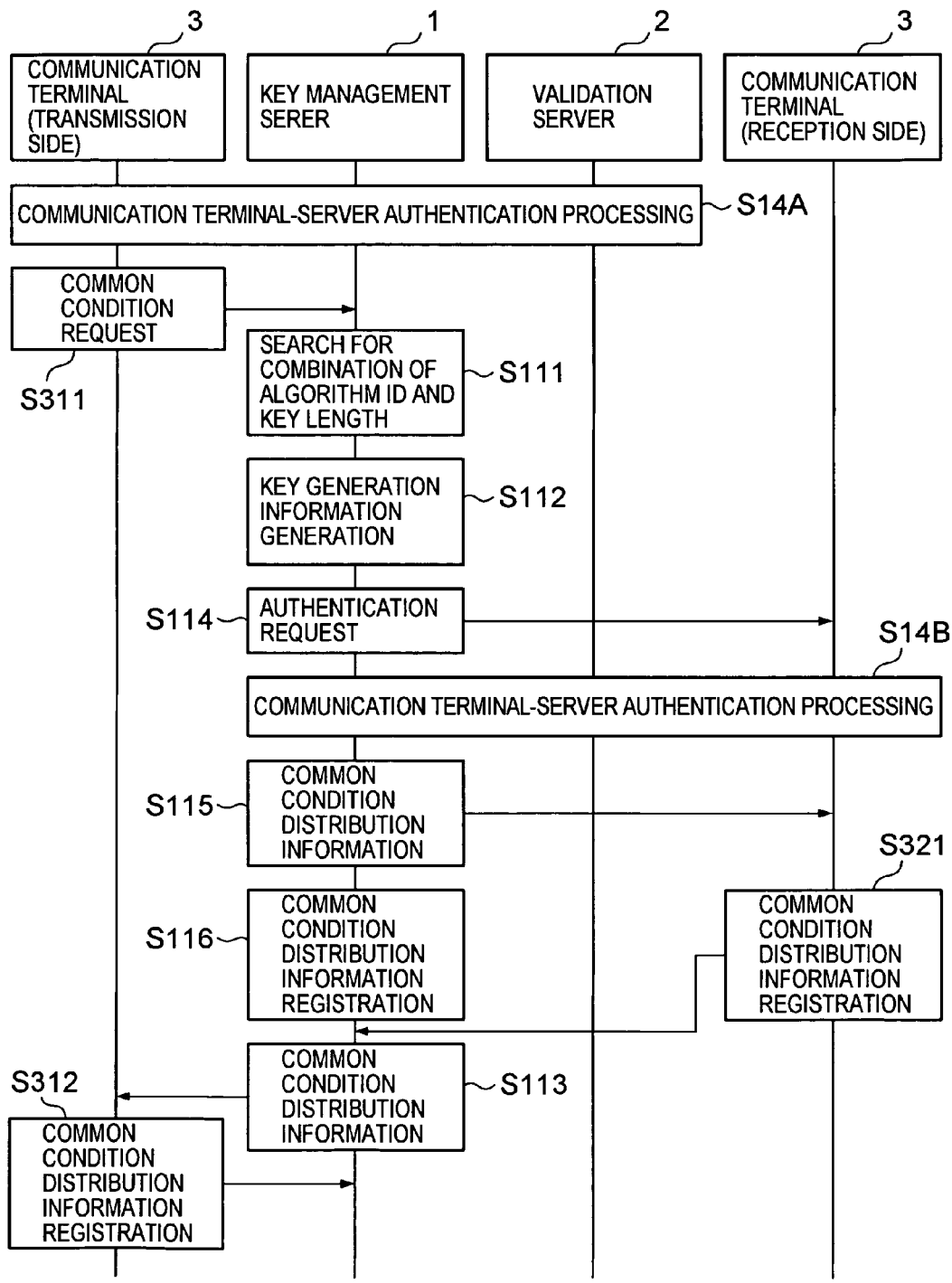
FIG. 15 is a view for explaining a common condition request message response common condition distribution processing.

FIG. 15 is a view for explaining the common condition request message response common condition distribution processing.

In the communication terminal (transmission side) 3 (hereinafter, referred to as the transmission-side communication terminal 3) that is to perform the cryptographic communication with another one of the communication terminals (reception side) 3 (hereinafter, referred to as the reception-side communication terminal 3), when the common condition requesting/updating unit 306 receives a transmission instruction of a common condition request message accompanied by the designation of a terminal URI of the reception-side communication terminal 3 and the communication period from the terminal cryptographic communication unit 308, the common condition requesting/updating unit 306 checks whether or not an encryption key used for the cryptographic communication with the key management server 1 is set in the server cryptographic communication unit 302. If not, the communication terminal-server authentication processing shown in FIG. 14 is performed among the self communication terminal 3, the key management server 1, and the validation server 2 (S14A). By this processing, an encryption key used for the cryptographic communication with the key management server 1 is set in the server cryptographic communication unit 302. Then, the common condition requesting/updating unit 306 creates a common condition request message containing the URI of the self communication terminal 3 corresponding to the communication source terminal, and the URI of the reception-side communication terminal 3 corresponding to the communication destination terminal and the communication period notified from the terminal cryptographic communication unit 308 so as to transmit the thus created common condition request message to the key management server 1 by means of cryptographic communication through the server cryptographic communication unit 302 and the network IF unit 301 (S311).

In the key management server 1, upon reception of the common condition request message from the communication terminal 3 through the network IF unit 101 and the cryptographic communication unit 102, the common condition extracting/updating unit 108 searches for a combination of the algorithm ID (the field 1072) and the key length (the field 1073) contained in both the record 1070 containing the terminal URI of the communication source terminal contained in the common condition request message and the record 1070 containing the terminal URI of the communication destination terminal contained in the common condition request message from the communication condition storage unit 107 (S111). The common condition extracting/updating unit 108 also notifies the key generation information generating unit 109 of a key generation request accompanied by the designation of the algorithm ID and the key length found in the search and the communication period contained in the common condition request message.

It is recommended that the common condition extracting/updating unit 108 set an upper limit for the validity period so as to prevent the key generation information generating unit 109 from collectively generating key generation information described below with a validity period for several minutes, which is required for the communication terminal 3 to semi-permanently perform the cryptographic communication. When the communication period contained in the common condition request message exceeds the upper limit, the common condition extracting/updating unit 108 may shorten the communication period to the upper limit in place of the communication terminal so as to notify the key generation information generating unit 109 of the reduced communication period.

In response to the key generation request, the key generation information generating unit 109 generates plural pieces of key generation information with a validity period, each containing an encryption key used by the self communication terminal 3 for the cryptographic communication with the reception-side communication terminal 3 or a key type for generating the encryption key. A key ID corresponding to identification information is added to each of the plurality of generated key generation information (S112).

Figure 16:
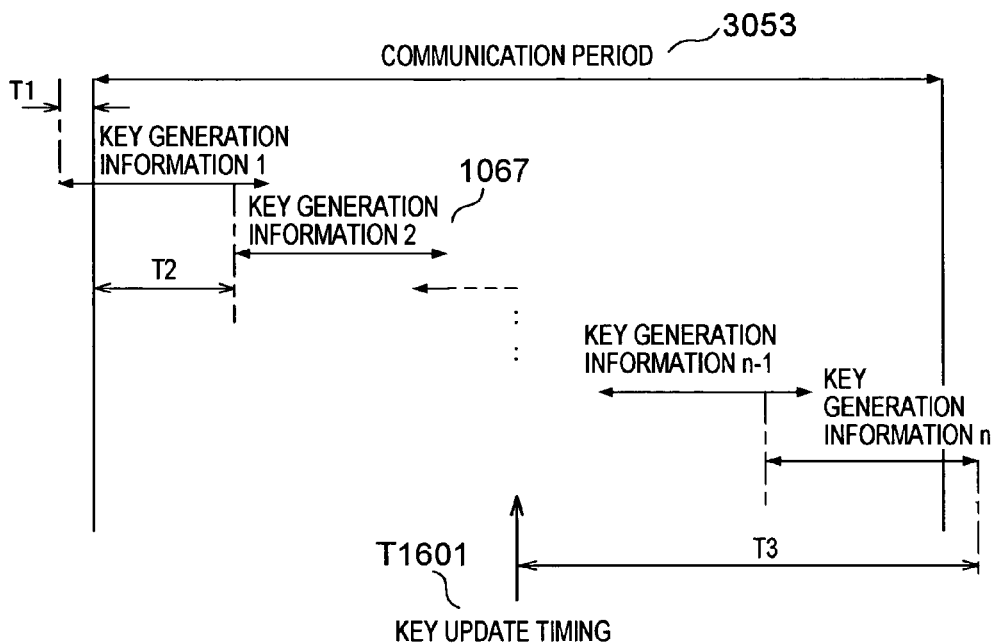
FIG. 16 is a view for explaining a processing of generating key generation information with a validity period.

The key length of the encryption key is set to that designated by the common condition extracting/updating unit 108. As shown in FIG. 16, the key generation information generating unit 109 generates n-key generation information with the validity period so that a start time of the validity period of the first key generation information 1067 is earlier than the start time of the communication period 3053 designated by the common condition extracting/updating unit 108, an end time of the validity period of the n-th key generation information 1067 is later than the end time of the communication period 3053, and a start time of the validity period of i ($2 \leq i \leq n$)-th key generation information 1067 is earlier than the end time of the validity period of the (i−1)-th key.

More specifically, a time earlier than the start time of the communication period 3053 by a predetermined time T1 is set as the start time of the validity period of the first key generation information 1067, while a time later than the start time of the communication period 3053 by a predetermined time T2 (>T1) is set as the end time of the validity period of the first key generation information 1067. Next, a time earlier than the end time of the validity period of the first key generation information 1067 by the predetermined time T1 is set as a start time of the validity period of the second key generation information 1067, while a time later than the end time of the validity period of the first key generation information 1067 is set as an end time of the validity period of the second key generation information 1067. This processing is repeated until the key generation information 1067 having the end time of the validity period later than the end time of the communication period 3053 is generated so as to generate n-key generation information, each having the validity period.

It is recommended that the validity period of the key generation information be set shorter than a time required for an illegal third party to estimate the key generation information by, for example, a brute force calculation from the encryption information obtained from a cryptographic communication channel between the key management server 1 and the communication terminal 3.

Next, the key generation information generating unit 109 refers to the URI-IP conversion TL 110 to obtain IP addresses each corresponding to the terminal URI of the communication source terminal and the terminal URI of the communication destination terminal contained in the common condition request message received from the communication terminal 3. Then, the key generation information generating unit 109 generates common condition distribution information, which contains the terminal URI and the IP address of the communication source terminal, the terminal URI and the IP address of the communication destination terminal, the algorithm ID and the key length searched in S111, and the plural pieces of key generation information with the validity period generated by the key generation information generating unit 109 in S112, and notifies the cryptographic communication unit 102 of the generated common condition distribution information. In response to the common condition distribution information, the cryptographic communication unit 102 uses the encryption key set in the cryptographic communication unit 102 in association with the IP address of the communication destination terminal in the common condition distribution information to encrypt the common condition distribution information so as to transmit the encrypted common condition distribution information to the IP address of the communication destination terminal through the network IF unit 101 (S115). Moreover, the common condition extracting/updating unit 108 stores the common condition distribution information as distributed information in the distributed information storage unit 111 (S116).

When the encryption key set in the cryptographic communication unit 102 in association with the IP address of the communication destination terminal in the common condition distribution information is not present, the cryptographic communication unit 102 transmits an authentication request to the IP address of the communication destination terminal through the network IF unit 101 (S114). As a result, the communication terminal-server authentication processing shown in FIG. 14 is performed among the communication terminal 3 corresponding to the communication destination terminal, the key management server 1, and the validation server 2 (S14B). As a result of the processing, an encryption key is set in the cryptographic communication unit 102 in association with the IP address of the communication source terminal in the common condition distribution information. Thereafter, the cryptographic communication unit 102 executes S115.

In the reception side communication terminal (communication destination terminal) 3, upon reception of the common condition distribution information registered with the terminal URI of the self communication terminal 3 as any one of the source URI 1061 and the destination URI 1063 from the key management server 1 through the network IF unit 301 and the server cryptographic communication unit 302, the common condition requesting/updating unit 306 stores the common condition distribution information in the common condition storage unit 307 and returns a response to the key management server 1 (S321).

In the key management server 1, upon reception of the response of the common condition distribution information registration from the reception-side communication terminal 3, the cryptographic communication unit 102 uses the encryption key set therein in association with the IP address of the communication source terminal of the common condition distribution information to encrypt the common condition distribution information and then transmits the encrypted common condition distribution information to the IP address of the communication source terminal through the network IF unit 101 (S113).

In the transmission side communication terminal (communication source terminal) 3, upon reception of the common condition distribution information registered with the terminal URI of the self communication terminal 3 as any one of the source URI 1061 and the destination URI 1063 from the key management server 1 through the network IF unit 301 and the server cryptographic communication unit 302, the common condition requesting/updating unit 306 stores the common condition distribution information in the common condition storage unit 307 and returns a response to the key management server 1 (S312).

For the registration of the common condition distribution information in the reception-side and the transmission-side communication terminals 3 (S312 and S321), specifically, the records 3070 for several minutes of the key generation information 1067 contained in the received common condition distribution information are generated so as to be added to the common condition storage unit 307. When the terminal URI and the IP address of the self communication terminal 3 are registered as the source URI 1061 and the source IP address 1062 of the common condition distribution information, the destination URI 1063 and the destination IP address 1064 of the common condition distribution information are registered in the fields 3071 and 3072 of each of the added records 3070. On the other hand, when the terminal URI and the IP address of the self communication terminal 3 are registered as the destination URI 1063 and the destination IP address 1064 of the common condition distribution information, the source URI 1061 and the source IP address 1062 of the common condition distribution information are registered in the fields 3071 and 3072 of each of the added records 3070. Moreover, in the fields 3073 and 3074 of each of the added records 3070, the algorithm ID 1065 and the key length 1064 of the common condition distribution information are registered. Furthermore, in the fields 3075 to 3077 of the n-th record 3070 of the added records 3070, a validity period 10671, a key ID 10672, and a key or a key type 10673 contained in the n-th key generation information 1067 of the common condition distribution information are registered. This processing is performed for all the added records 3070.

Next, a processing, in which the key management server 1 responds to the key update request message from the communication terminal 3 to distribute common condition distribution information (a key update request message response common condition distribution processing), will be described.

Figure 17:
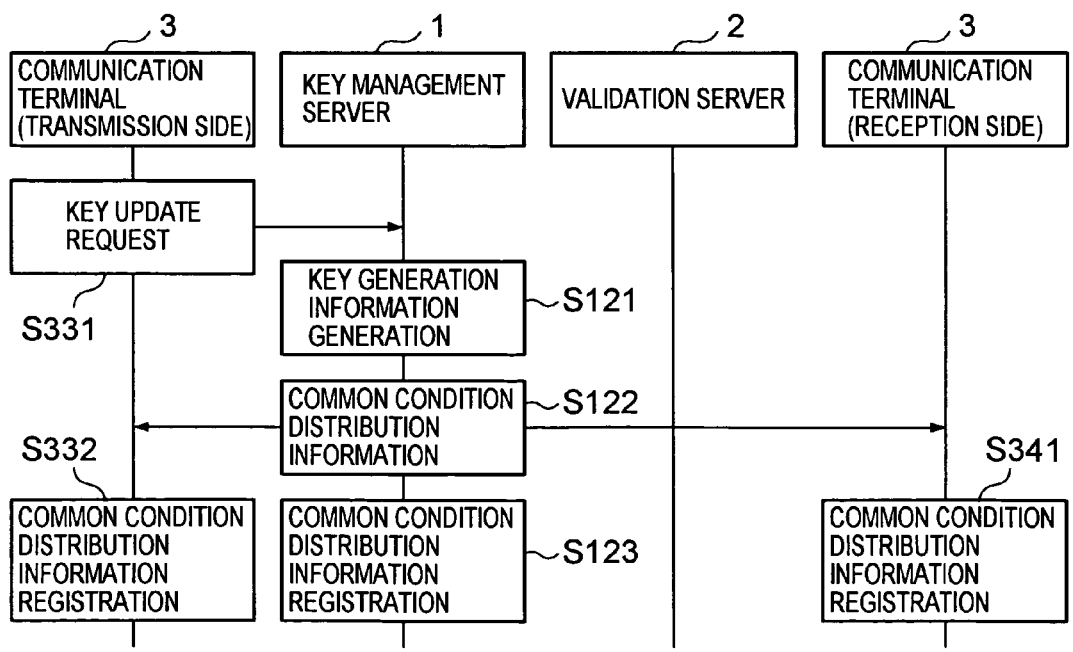
FIG. 17 is a view for explaining a key update request message response common condition distribution processing.

FIG. 17 is a view for explaining the key update request message response common condition distribution processing.

In the communication terminal 3 that is performing the cryptographic communication with another one of the communication terminals 3, when the common condition requesting/updating unit 306 receives a transmission instruction of a key update request message accompanied by the designation of a terminal URI of the reception-side communication terminal 3, an algorithm ID, a key length, and the communication period from the terminal cryptographic communication unit 308, the common condition requesting/updating unit 306 creates a key update request message containing the URI of the self communication terminal 3 corresponding to the communication destination terminal, an algorithm ID, a key length, and the communication period notified from the terminal cryptographic communication unit 308 so as to transmit the thus created common condition request message to the key management server 1 by means of cryptographic communication through the server cryptographic communication unit 302 and the network IF unit 301 (S331).

In the key management server 1, upon reception of the key update request message from the communication terminal 3 through the network IF unit 101 and the cryptographic communication unit 102, the common condition extracting/updating unit 108 notifies the key generation information generating unit 109 of a key generation request accompanied by the designation of the key length and the communication period contained in the key update request message. In response to the key generation request, the key generation information generating unit 109 generates one or plural pieces of key generation information with the validity period, each containing an encryption key used by the self communication terminal 3 for the cryptographic communication with another one of the communication terminals 3 or a key type for generating the encryption key, in the same manner as in S112 in FIG. 15. Moreover, the key generation information generating unit 109 adds a key ID corresponding to identification information to each of one or the plurality of generated key generation information (S121).

Next, the key generation information generating unit 109 refers to the URI-IP conversion TL 110 to obtain IP addresses each corresponding to the terminal URI of the communication source terminal and the terminal URI of the communication destination terminal contained in the key update request message received from the communication terminal 3. Then, the key generation information generating unit 109 generates common condition distribution information, which contains the terminal URI and the IP address of the communication source terminal, the terminal URI and the IP address of the communication destination terminal, the algorithm ID and the key length contained in the key update request message, and one or the plural pieces of key generation information with the validity period generated by the key generation information generating unit 109 in S121, and notifies the cryptographic communication unit 102 of the generated common condition distribution information. In response to the common condition distribution information, the cryptographic communication unit 102 uses the encryption key set in the cryptographic communication unit 102 in association with the IP address of the communication source terminal in the common condition distribution information to encrypt the common condition distribution information so as to transmit the encrypted common condition distribution information to the IP address of the communication source terminal through the network IF unit 101. Similarly, the cryptographic communication unit 102 uses the encryption key set in the cryptographic communication unit 102 in association with the IP address of the communication destination terminal of the common condition distribution information to encrypt the common condition distribution information and transmits the encrypted common condition distribution information to the IP address of the communication destination terminal through the network IF unit 101 (S122). Moreover, the common condition extracting/updating unit 108 stores the common condition distribution information as distributed information in the distributed information storage unit 111 (S123).

In the communication terminal 3, upon reception of the common condition distribution information registered with the terminal URI of the self communication terminal 3 as any one of the source URI 1061 and the destination URI 1063 from the key management server 1 through the network IF unit 301 and the server cryptographic communication unit 302, the common condition requesting/updating unit 306 stores the common condition distribution information in the common condition storage unit 307 in the same manner as in S312 in FIG. 15 (S332 and S341).

Next, a processing, in which the communication terminal 3 responds to the key invalidation request message from the key management server 1 to invalidate the common condition stored in the self communication terminal 3 (a key invalidation processing), will be described.

Figure 18:
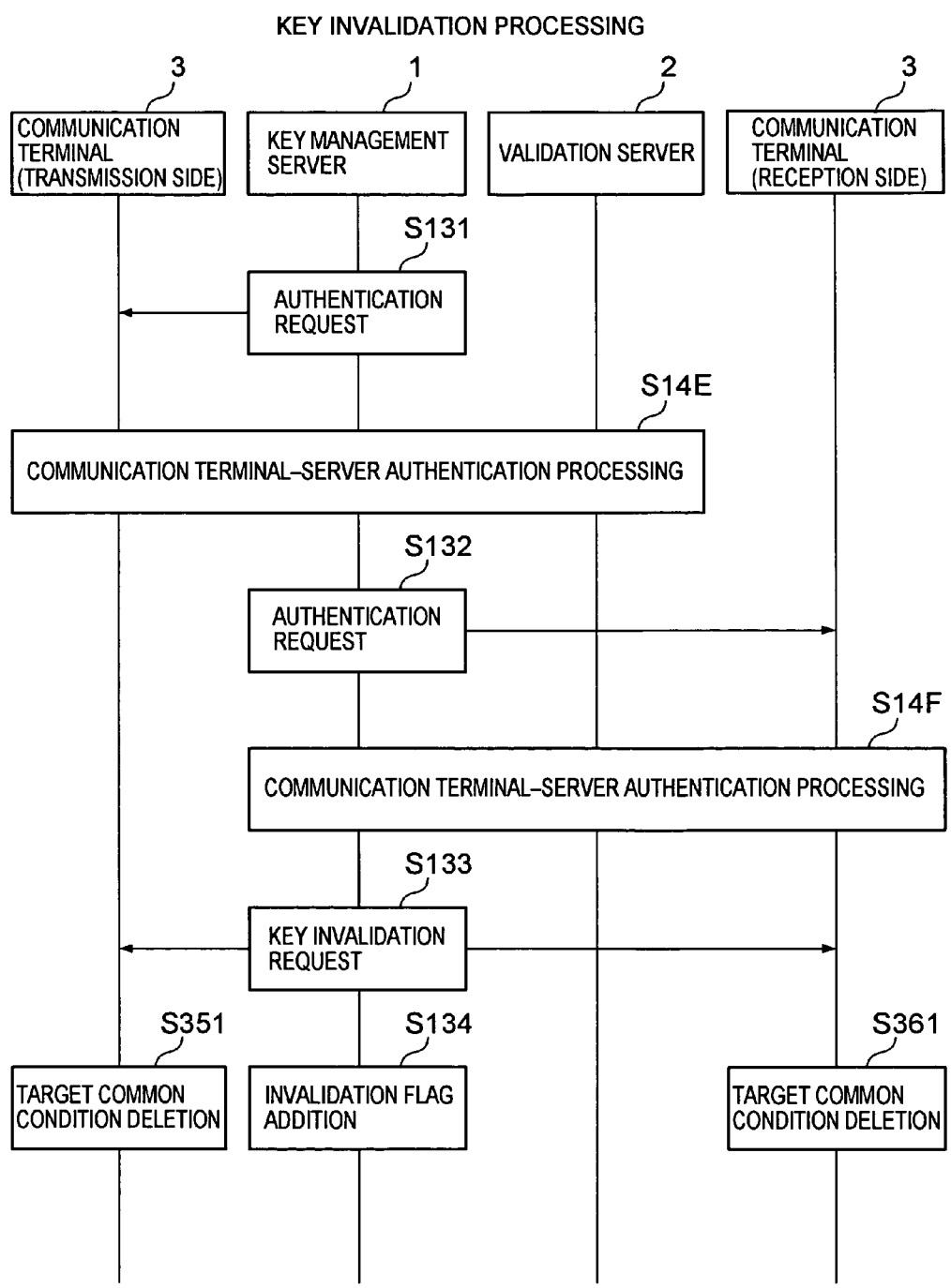
FIG. 18 is a view for explaining a key invalidation processing.

FIG. 18 is a view for explaining the key invalidation processing.

In the key management server 1, upon reception of a key invalidation instruction accompanied by the designation of any of the distributed information containing the key generation information whose validity period has not expired, the key invalidation requesting unit 112 reads out the designated distributed information from the distributed information storage unit 111 to create a key invalidation request message which contains the terminal URI of the communication source terminal and the terminal URI and the algorithm ID of the communication destination terminal, and the key ID of the key generation information to be invalidated, which are contained in the distributed information.

The key invalidation requesting unit 112 refers to the URI-IP conversion TL 110 to obtain IP addresses respectively corresponding to the terminal URI 1121 of the communication source terminal and the terminal URI 1122 of the communication destination terminal, which are contained in the key invalidation request message. Then, the key invalidation requesting unit 112 notifies the cryptographic communication unit 102 of the IP address of the communication source terminal, the IP address of the communication destination terminal, and the key invalidation request message. In response to them, the cryptographic communication unit 102 uses the encryption key set in the cryptographic communication unit 102 in association with the IP address of the communication source terminal to encrypt the key invalidation request message and then transmits the encrypted key invalidation request message to the IP address of the communication source terminal through the network IF unit 101. Similarly, the cryptographic communication unit 102 uses the encryption key set in the cryptographic communication unit 102 in association with the IP address of the communication destination terminal to encrypt the key invalidation request message and then transmits the encrypted key invalidation request message to the IP address of the communication destination terminal through the network IF unit 101 (S133). Then, a flag (not shown) indicating the invalidation of the key is added to the key generation information to be invalidated stored in the distributed information storage unit 111 or its key ID (S134).

When the encryption key set in the cryptographic communication unit 102 in association with the IP address of the communication source terminal in the key invalidation request message is not present, the cryptographic communication unit 102 transmits an authentication request to the IP address of the communication source terminal through the network IF unit 101 (S131). As a result, the communication terminal-server authentication processing shown in FIG. 14 is performed among the communication terminal 3 corresponding to the communication source terminal (on the transmission side), the key management server 1, and the validation server 2 (S14E). As a result of the processing, an encryption key is set in the cryptographic communication unit 102 in association with the IP address of the communication source terminal in the common condition distribution information. Similarly, when the encryption key set in the cryptographic communication unit 102 in association with the IP address of communication destination terminal in the key invalidation request message is not present, the cryptographic communication unit 102 transmits an authentication request to the IP address of the communication destination terminal through the network IF unit 101 (S132). As a result, the communication terminal-server authentication processing shown in FIG. 14 is performed among the communication terminal 3 corresponding to the communication destination terminal (on the reception side), the key management server 1, and the validation server 2 (S14F). As a result of the processing, the encryption key is set in the cryptographic communication unit 102 in association with the IP address of the communication destination terminal in the common condition distribution information. Thereafter, the cryptographic communication unit 102 executes S133.

In the communication terminal 3, upon reception of the key invalidation request message registered with the terminal URI of the self communication terminal 3 as any one of the source URI 1121 and the destination URI 1122 from the key management server 1 through the network IF unit 301 and the server cryptographic communication unit 302, the common condition requesting/updating unit 306 searches for the record 3070 including the terminal URI, the algorithm ID, and the key ID of the communication terminal 3 other than the self communication terminal 3 contained in the key invalidation request message from the common condition storage unit 307 to delete the record 3070 found in the search from the common condition storage unit 307 (S351 and S361).

Next, a processing, in which the key management server 1 responds to the communication condition registration request message from the communication terminal 3 to register the communication condition of the communication terminal 3 (a communication condition registration processing), will be described.

Figure 19:
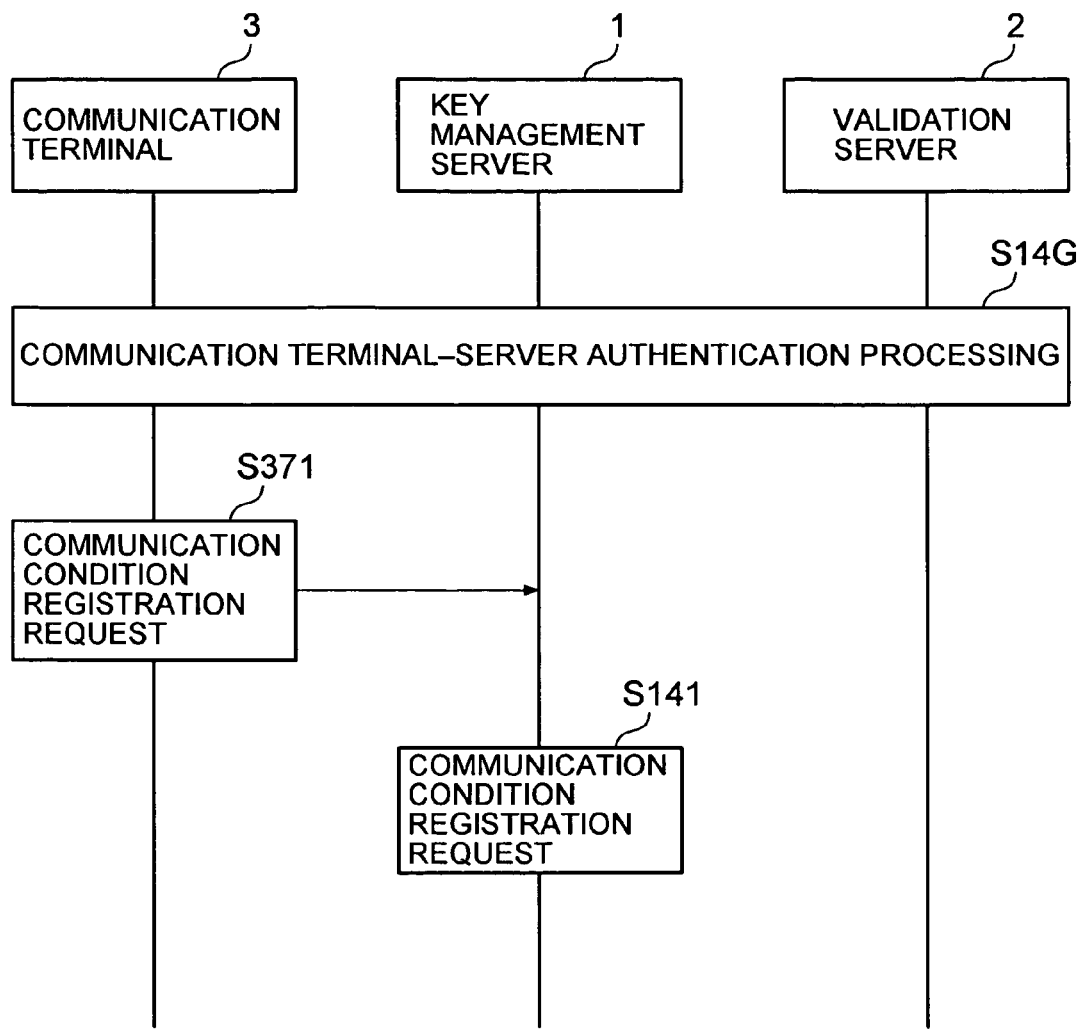
FIG. 19 is a view for explaining a communication condition registration processing.

FIG. 19 is a view for explaining the communication condition registration processing.

In the communication terminal 3, upon reception of a registration instruction of the communication condition from the operator of the self communication terminal 3, the communication condition registration applying unit 304 generates a communication condition registration request message containing each of the records 3050 (the combination of the algorithm ID and the key length) stored in the communication condition storage unit 305 and the terminal URI of the self communication terminal 3. Then, the communication condition registration applying unit 304 transmits the communication condition registration request message to the key management server 1 through the server cryptographic communication unit 302 and the network IF unit 301 (S371).

When the encryption key used for the cryptographic communication with the key management server 1 is not set in the server cryptographic communication unit 302, the communication terminal-server authentication processing shown in FIG. 14 is performed among the self communication terminal 3, the key management server 1, and the validation server 2 (S14G). As a result, the encryption key used for the cryptographic communication with the key management server 1 is set in the server cryptographic communication unit 302. Thereafter, the server cryptographic communication unit 302 executes S371.

In the key management server 1, upon reception of the communication condition registration request message from the communication terminal 3 through the network IF unit 101 and the cryptographic communication unit 102, the communication condition registering unit 106 adds the record 1070 to the communication condition storage unit 107 for each of the communication conditions (the combination of the algorithm ID and the key length) 3042 contained in the communication condition registration request message. Then, the communication condition registering unit 106 registers the terminal URI contained in the communication condition registration request message in the field 1071 of each of the records 1070 and registers the algorithm ID and the key length of any of the communication conditions 3042 registered in the communication condition registration request message in the fields 1072 and 1073 (S141).

Next, a cryptographic communication processing between the communication terminals 3 (a terminal-terminal cryptographic communication processing) will be described.

Figure 20:
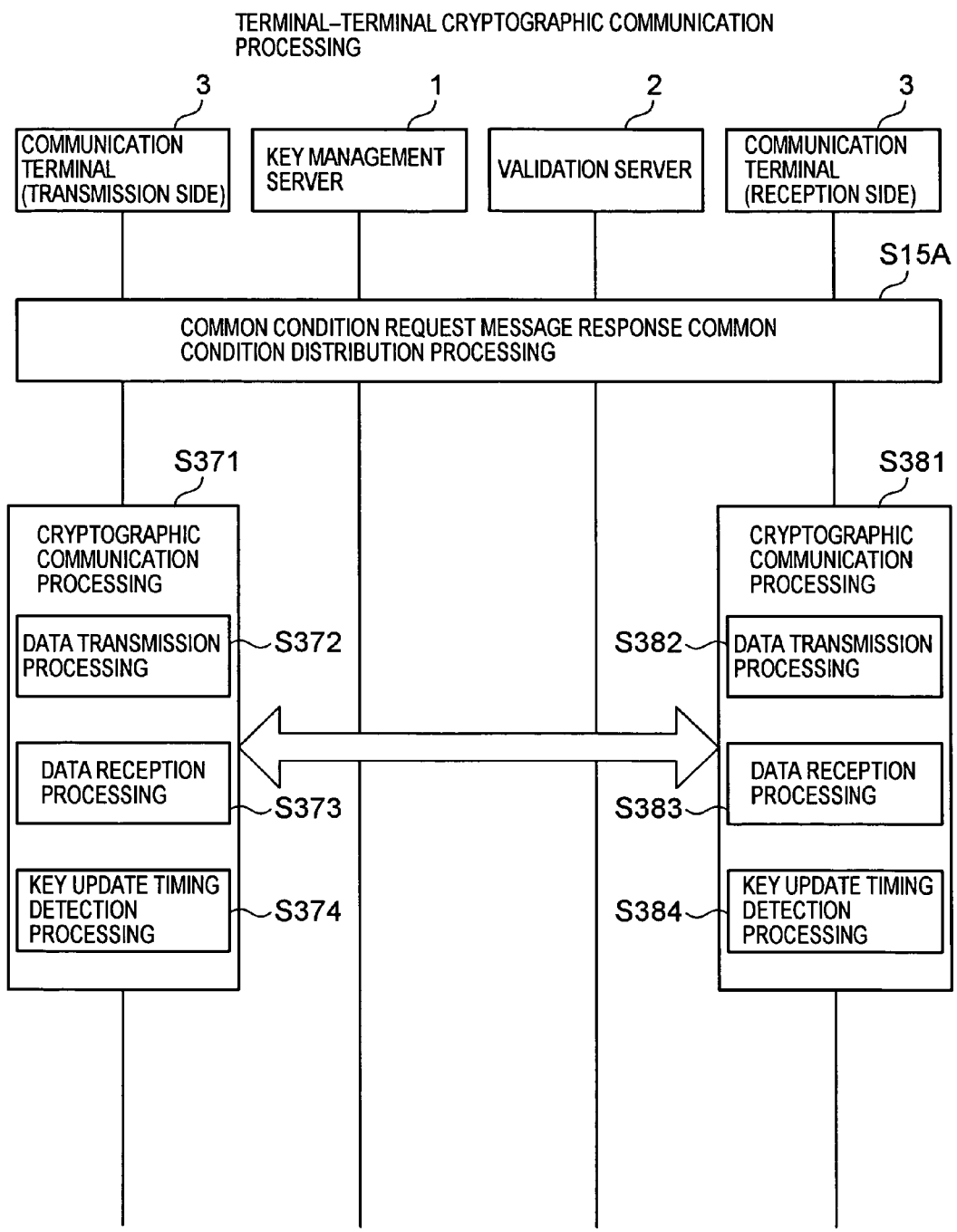
FIG. 20 is a view for explaining a terminal-terminal cryptographic communication processing.

FIG. 20 is a view for explaining the terminal-terminal cryptographic communication processing.

In the communication terminal (on the transmission side) 3 that is to perform the cryptographic communication with another one of the communication terminals (on the reception side) 3, the selecting unit 3081 searches for the record 3070 including the field 301 registered with the terminal URI of the reception-side communication terminal 3 and the field 3075 registered with the validity period including the current time from the common condition storage unit 307. When such a record 3070 is present, the cryptographic communication processing is started between the transmission-side communication terminal 3 and the reception-side communication terminal 3 (S371 and S381) On the other hand, when such the record 3070 is not present, the common condition request message response common condition distribution processing shown in FIG. 15 is performed (S15A) so that the transmission-side communication terminal 3 and the reception-side communication terminal 3 share the communication condition. Thereafter, the cryptographic communication processing is started between the transmission-side communication terminal 3 and the reception-side communication terminal 3 (S371 and S381). The cryptographic communication processing (S371 and S381) herein contains a data transmission processing (S372 and S382), a data reception processing (S373 and S383), and a key update timing detection processing (S374 and S384).

Figure 21:
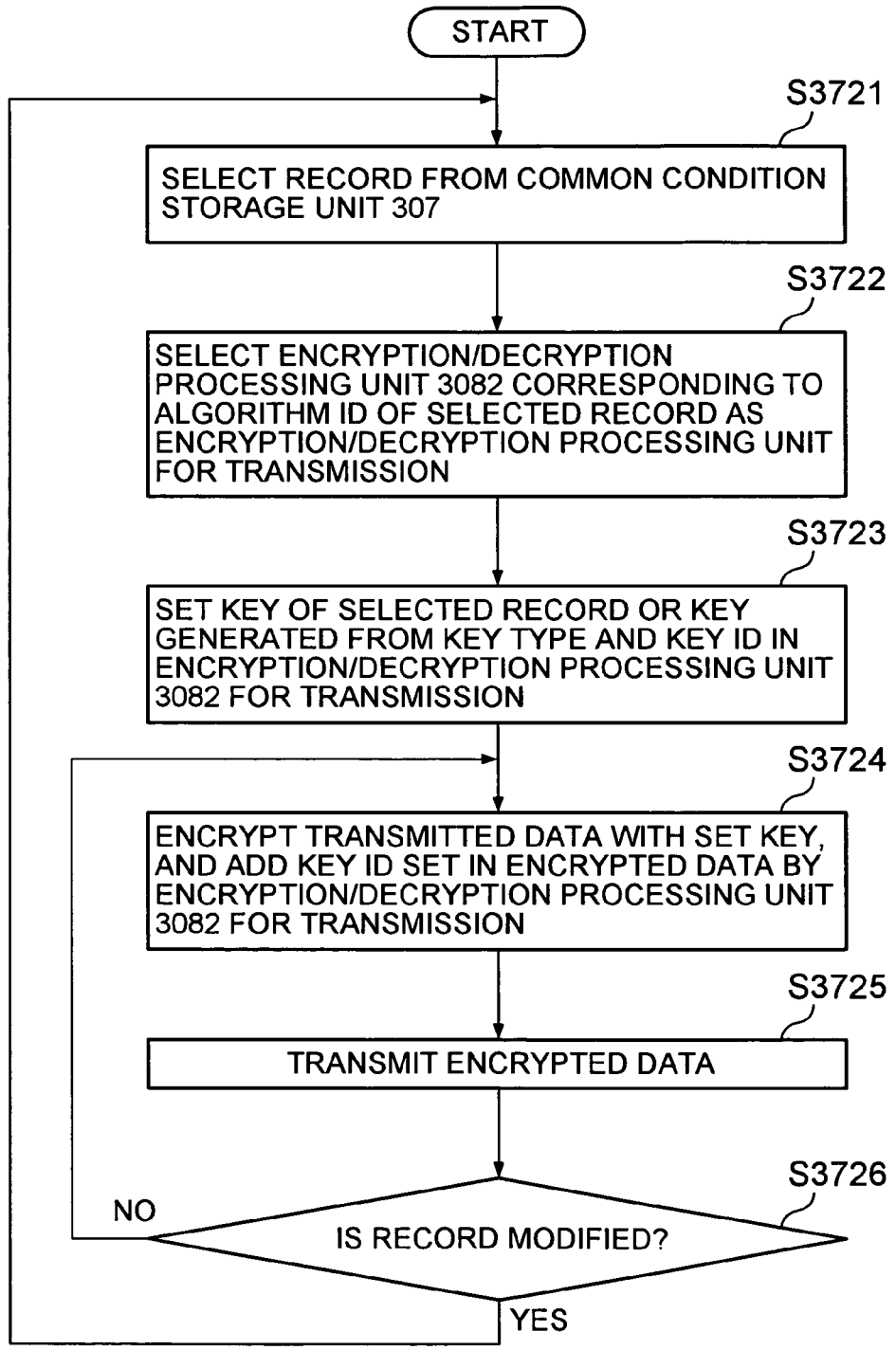
FIG. 21 is a view for explaining a data transmission processing (S372 and S382 in FIG. 20)

FIG. 21 is a view for explaining the data transmission processing (S372 and S382 in FIG. 20).

In the communication terminal 3, the selecting unit 3081 selects the record 3070, which includes the field 301 registered with the terminal URI of the communication terminal 3 with which the application unit 309 intends to perform data transmission and reception, the field 3075 registered with the validity period including the current time, and the last end time of the validity period, from the common condition storage unit 307 (S3721).

Next, the selecting unit 3081 selects the encryption/decryption processing unit 3082 associated with the algorithm ID registered in the field 3073 of the selected record 3070 as an encryption/decryption processing unit for transmission (S3722). The selecting unit 3081 also sets the key ID registered in the field 3076 of the selected record 3070 and the key having the key length registered in the field 3074 of the record 3070, which is registered in the field 3077 of the record 3070, or the key having the key length registered in the field 3074 of the record 3070, which is generated from the key type, in the encryption/decryption processing unit 3082 for transmission (S3723).

The encryption/decryption processing unit 3082 for transmission encrypts the data received from the application unit 309 with the encryption key set in the encryption/decryption processing unit 3082 itself to generate encrypted data and then adds the key ID set in the encryption/decryption processing unit 3082 itself to the encrypted data (S3724). Then, the encryption/decryption processing unit 3082 transmits the encrypted data to the communication terminal 3 corresponding to the communication counterpart through the network IF unit 301 (S3725).

The selecting unit 3081 searches through the common condition storage unit 307 to check whether or not the record 3070, which includes the field 301 registered with the terminal URI of the communication terminal 3, and the field 3075 registered with the validity period including the current time and the last end time of the validity period record, is modified from the record 3070 selected in S3721 (S3726). When the record 3070 is modified, the processing proceeds to S3721. If not, the processing proceeds to S3724. The above processing is continued until the data transmission and reception by the application unit 309 terminate.

Figure 22:
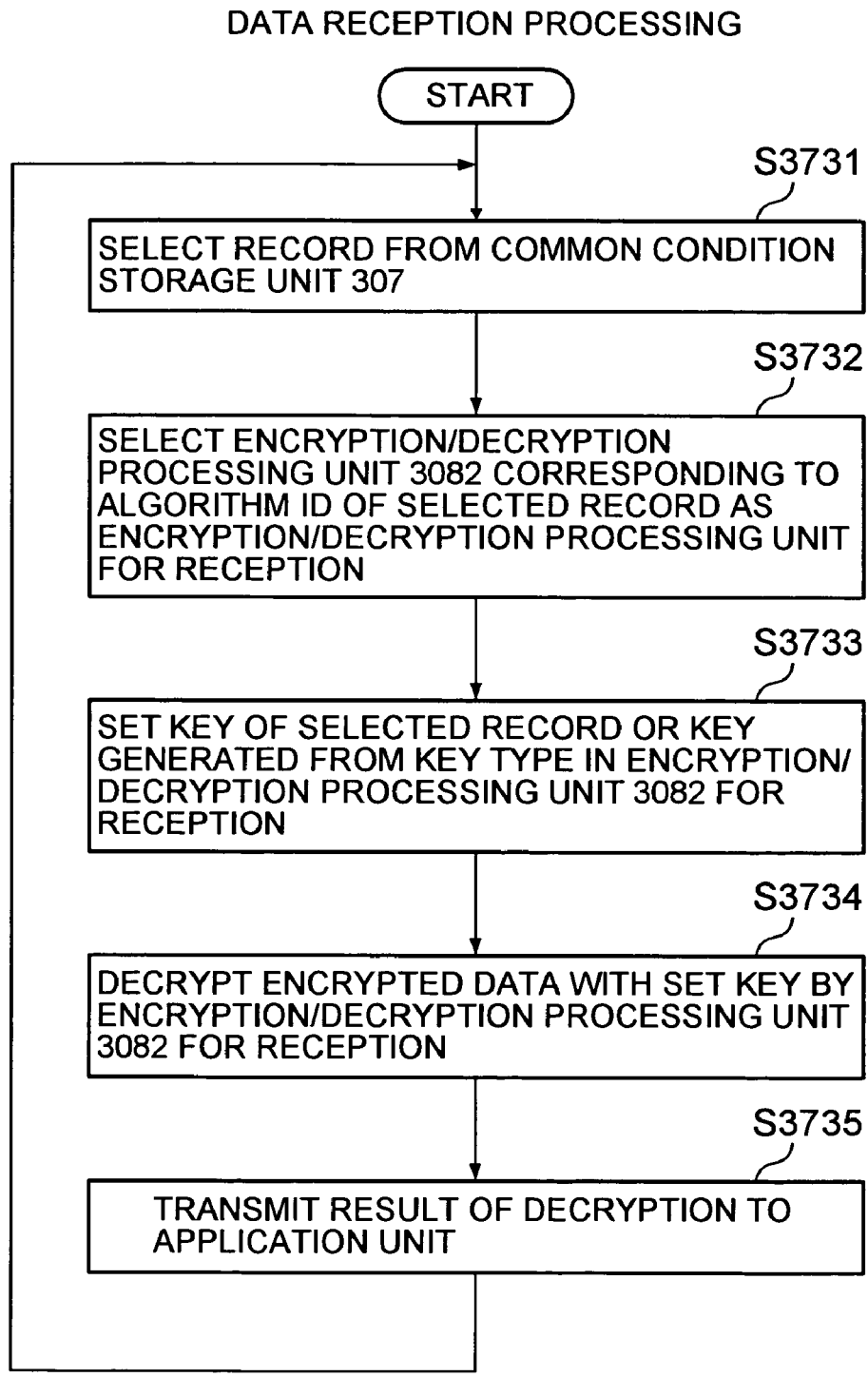
FIG. 22 is a view for explaining a data reception processing (S373 and S383 in FIG. 20)

FIG. 22 is a view for explaining the data reception processing (S373 and S383 in FIG. 20).

In the communication terminal 3, the selecting unit 3081 selects the record 3070 including the field 3076 registered with the key ID added to the encrypted data received from another one of the communication terminals 3 through the network IF unit 301 and the field 3071 (or the field 3072) registered with the URI (or the IP address) of the other communication terminal 3 from the common condition storage unit 307 (S3731).

Next, the selecting unit 3081 selects the encryption/decryption processing unit 3082 associated with the algorithm ID registered in the field 3073 of the selected record 3070 as an encryption/decryption processing unit for reception (S3732). The selecting unit 3081 also sets the key having the key length registered in the field 3074 of the record 3070, which is registered in the field 3077 of the selected record 3070, or the key having the key length registered in the field 3074 of the record 3070, which is generated from the key type, in the encryption/decryption processing unit 3082 for reception (S3733).

The encryption/decryption processing unit 3082 for reception decrypts the encrypted data received from the other communication terminal 3 through the network IF unit 301 with the encryption key set in the encryption/decryption processing unit 3082 for reception itself (S3734). Then, the encryption/decryption processing unit 3082 for reception passes the received data corresponding to the result of decryption to the application unit 309 (S3735). The above processing is continued until the data transmission and reception by the application unit 309 terminate.

Figure 23:
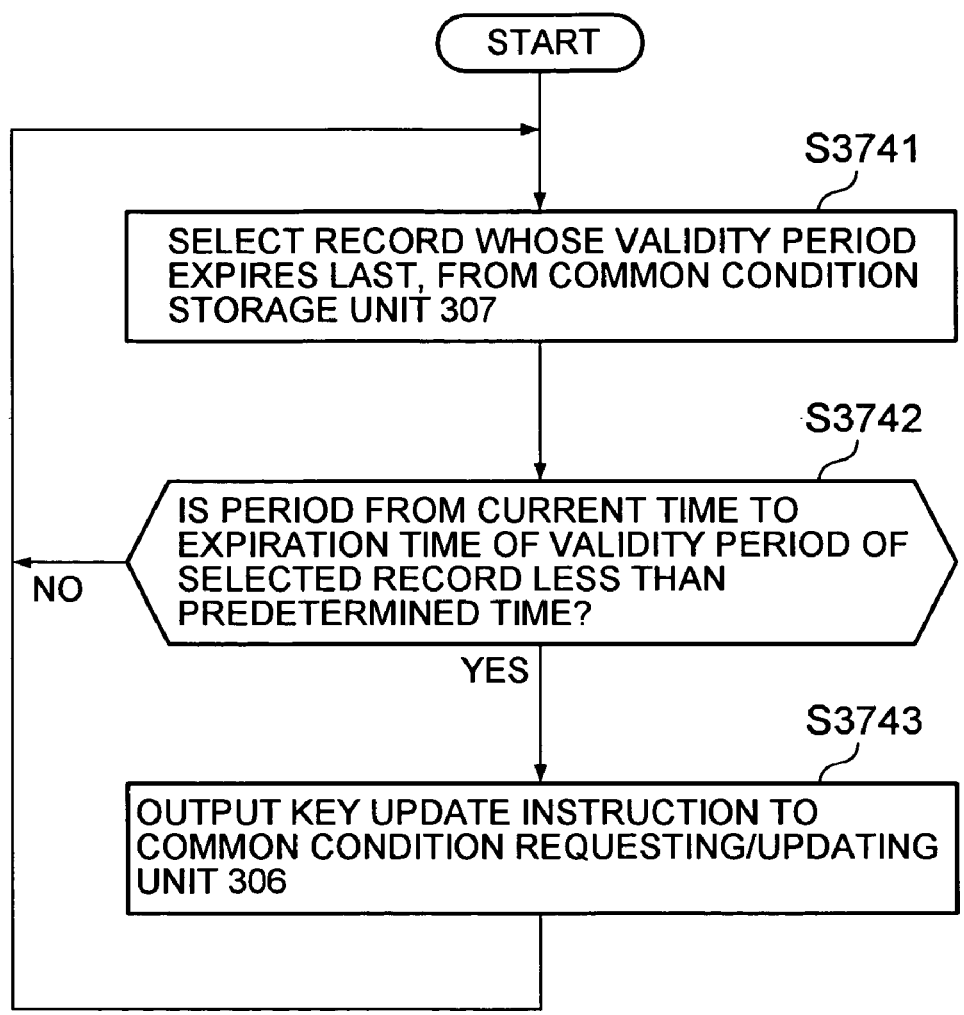
FIG. 23 is a view for explaining a key update timing detection processing (S374 and S384 in FIG. 20).

FIG. 23 is a view for explaining the key update timing detection processing (S374 and S384 in FIG. 20).

In the communication terminal 3, the selecting unit 3081 selects the record 3070, which includes the field 3071 (or the field 3072) registered with the URI (or the IP address) of the communication terminal 3 corresponding to the communication counterpart being in the cryptographic communication and the field 3075 registered with the last end time of the validity period, from the common condition storage unit 307 (S3741).

Next, the selecting unit 3081 checks whether or not a period from the current time to the end time of the validity period registered in the field 3075 of the selected record 3070 is less than a predetermined period of time (for example, ten minutes) (S3742). If not, it is judged that it is not a key update timing so that the processing returns to S3741. On the other hand, when it is less than the predetermined period of time, the selecting unit 3081 judges that it is a key update timing (see T1601 in FIG. 16) so as to notify the common condition requesting/updating unit 306 of the terminal URI of the communication terminal 3 corresponding to the communication counterpart, the algorithm ID and the key length registered in the fields 3073 and 3074 of the selected record 3070, and a communication period predefined by, for example, the operator of the self communication terminal 3 (for example, the same period as the validity period of one key generation information with the validity period). In this manner, the selecting unit 3081 instructs the common condition requesting/updating unit 306 to transmit a key update request message to the key management server 1 (S3743). Then, the processing returns to S3741.

Alternatively, the predetermined time in S3742 may be set to be a period from the start time of the validity period of the first key generation information to the end time of the validity period of the m-th key generation information with the validity period so that the predefined communication period in S3743 may be the same as the predetermined period of time. In this manner, the key generation information with the validity period that does not expire yet, which is used by the communication terminal 3 for the cryptographic communication with the communication counterpart, can be constantly kept for the same number of minutes.

An embodiment of the present invention has been described above.

In this embodiment, for each of the communication terminals 3, the key management server 1 manages the cryptographic algorithms available in the communication terminal 3. Moreover, the key management server 1 searches for the cryptographic algorithm common to the communication terminals 3 performing the cryptographic communication so as to notify each of the communication terminals 3 performing the cryptographic communication of the cryptographic algorithm found in the search together with the plural pieces of key generation information, each containing the key used in the cryptographic algorithm or the key type for generating the key. On the other hand, each of the communication terminals 3 performing the cryptographic communication sequentially switches the plural pieces of key generation information notified from the key management server 1 so as to perform the cryptographic communication with the communication counterpart in accordance with the cryptographic algorithm notified from the key management server 1. Therefore, according to this embodiment, even when a plurality of cryptographic algorithms are present, the cryptographic communication between the communication terminals 3 can be realized. Secure cryptographic communication for a long time also can be realized without increasing a processing overhead at each of the communication terminals 3.

The present invention is not limited to the above-described embodiments and various variations are possible within the scope of the invention.

In the above-described embodiment, there has been described the example case where the communication terminal 3 includes the communication period in each of the common condition request message and the key update request message, and the key management server 1 generates plural pieces of key generation information with the validity period in accordance with the communication period contained in each of the messages. However, the present invention is not limited thereto.

For example, instead of the communication period, the number of key generation information (the number of keys) with the validity period may be contained in the common condition request message and/or the key update request message so that the key management server 1 generates plural pieces of key generation information with the validity period in accordance with the number of keys contained in the message. Specifically, the key generation information generating unit 109 of the key management server 1 may generate key generation information with the validity period as many as the designated number (n) of keys such that the start time of the validity period of the first key generation information is the current time and the start time of the validity period of the i ($2 \leq i \leq n$)-th key generation information is earlier than the end time of the validity period of the (i−1)-th key. Alternatively, key generation information all having the same validity period as many as the designated number (n) of keys may be generated.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A cryptographic communication system, comprising:
   a plurality of communication terminals which perform cryptographic communication; and
   a management server which manages the communication condition of each communication terminal,
   wherein each communication terminal comprises:
      a plurality of encryption/decryption processing means using different cryptographic algorithms;
      common condition requesting means which transmits a common condition request to the management server, the common condition request containing a terminal ID of the communication terminal itself and a terminal ID of a communication destination terminal;
      common condition storing means which stores common condition information containing a terminal ID of a communication source terminal or the communication destination terminal, an algorithm ID of one the cryptographic algorithms for use by both the communication source terminal and the communication destination terminal, and plural pieces of key generation information;
      common condition obtaining means which receives the common condition information from the management server and stores it in the common condition storing means; and
      cryptographic communication means which searches the common condition storing means for the common condition information having a terminal ID of a communication counterpart, selects one of the plurality of encryption/decryption processing means for which the cryptographic algorithm has the algorithm ID contained in the common condition information found in the search, and uses the selected encryption/decryption processing means to perform the cryptographic communication with the communication terminal of the communication counterpart,
   wherein the management server comprises:
      communication condition storing means which stores, for each communication terminal, communication condition information containing the terminal ID of the communication terminal and the algorithm ID of each cryptographic algorithm used for the plurality of encryption/decryption processing means of the communication terminal;
      common condition request receiving means which receives a common condition request from one of the communication terminals acting as a source terminal;
      common condition search means which searches the common condition storing means for the algorithm ID contained in both the communication condition information containing the terminal ID of the communication source terminal which issued the received common condition request and the common condition information containing the terminal ID of a communication destination terminal indicated in the received common condition request;
      key generation information generating means which generates plural pieces of key generation information, each containing a key used in the encryption/decryption processing means for the cryptographic algorithm having the algorithm ID retrieved by the common condition search means or a key type for generating the key, and a key ID; and
      common condition transmission means which transmits the common condition information to the communication terminal having the terminal ID of the communication source terminal which issued the common condition request and to the communication terminal having the terminal ID of the communication destination terminal indicated in the received common condition request,
      the common condition information containing:
         the terminal ID of the communication source terminal and the terminal ID of the communication destination terminal of the common condition request received by the common condition request receiving means;
         the algorithm ID retrieved by the common condition search means; and
         the plural pieces of key generation information generated by the key generation information generating means in response to the common condition request,
   wherein:
   the cryptographic communication means of the source communication terminal selects key generation information from the plural pieces of key generation information contained in the common condition information retrieved by the search, uses the key contained in the selected key generation information or the key generated from the key type contained in the key generation information to cause the selected encryption/decryption processing means to generate encrypted data, and transmits cryptographic communication information containing the encrypted data and the key ID contained in the selected key generation information to a communication counterpart destination terminal, while the cryptographic communication means of the counterpart communication destination terminal selects the key generation information having the key ID contained in the cryptographic communication information received from the source communication terminal from the plural pieces of key generation information and uses the key contained in the selected key generation information or the key generated from the key type contained in the key generation information to cause the selected encryption/decryption processing means to decrypt the encrypted data contained in the cryptographic communication information received from the communication source communication terminal;
   the common condition request received at the management server contains a communication period representing a period of communication between the source and destination terminals;
   the key generation information generating means generates n pieces of key generation information such that a validity period of the first key starts not later than the communication period, a validity period of the n-th key ends not before the communication period, and a validity period of an i-th key ($2 \leq i \leq n$) starts not after the end of a validity period of the (i−1)-th key; and
   each cryptographic communication means selects or changes the key generation information in accordance with the validity period.

2. A cryptographic communication system according to claim 1, wherein:
   each piece of the communication condition information stored in the communication condition storing means of the management server further comprises a key length for use by the encryption/decryption processing means for which the cryptographic algorithm having the algorithm ID, for each of the algorithm IDs;
the common condition search means searches the communication condition storing means for a combination of algorithm ID and key length contained in both the communication condition information containing the terminal ID of the communication source terminal which issued the common condition request and the communication condition information containing the terminal ID of the communication destination terminal; and
the key generation information generating means generates plural pieces of key generation information, each containing the key used in the encryption/decryption processing means for which the cryptographic algorithm having the algorithm ID found by the common condition search means, the key having the key length retrieved by the common condition search means, or the key type for generating a key having the key length, and the key ID corresponding to identification information.

3. A cryptographic communication system according to claim 1, wherein:
each communication terminal further comprises common condition update requesting means which transmits a common condition update request containing the terminal ID of the communication source terminal, the terminal ID of the communication destination terminal, and the algorithm ID, which are contained in the common condition information stored in the common condition storing means, and the communication period which starts not after the end of the validity period of the n-th key and ends not before the validity period of the n-th key generated by the plural pieces of key generation information;
the management server further comprises common condition update request receiving means which receives the common condition update request from the communication terminal;
the key generation information generating means of the management server further generates plural pieces of key generation information, each containing the key used in the encryption/decryption processing means for the cryptographic algorithm having the algorithm ID contained in the received common condition update request or the key type for generating the key and the key ID corresponding to the identification information; and
the common condition transmitting means of the management server transmits updated common condition information to each of the source and destination communication terminals, the updated common condition information containing the terminal ID of the communication source terminal, the terminal ID of the communication destination terminal and the algorithm ID, which are contained in the received common condition update request, and the plural pieces of key generation information generated by the key generation information generating means in response to the received common condition update request.

4. A cryptographic communication system according to claim 1, wherein:
the management server further comprises:
distributed common condition storing means which stores the common condition information transmitted by the common condition transmitting means to the communication terminal;
invalidation instruction accepting means which accepts designation of common condition information whose key generation information is to be partially or entirely invalidated from the common condition information stored in the distributed common condition storing means; and
invalidation request transmitting means which transmits a partial or entire key generation information invalidation request contained in the common condition information to each of the communication terminal having the terminal ID of the communication source terminal contained in the common condition information designated by the invalidation instruction accepting means and the communication terminal having the terminal ID of the communication destination terminal contained in the common condition information; and
each communication terminal further comprises:
invalidation request receiving means which receives a key generation information invalidation request from the management server; and
invalidation means which searches the common condition storing means for the common condition information designated by the key generation information invalidation request received from the management server and performs an invalidation processing of the partial or entire key generation information contained in the common condition information found in the search.

5. A cryptographic communication system according to claim 1, wherein:
each communication terminal further comprises communication condition transmitting means which transmits communication condition information to the management server, the communication condition information containing the terminal ID of the communication terminal itself and the algorithm ID of the cryptographic algorithm used for each encryption/decryption processing means provided for the communication terminal; and
the management server further comprises communication condition management means which receives the communication condition information from the communication terminal and stores the received communication condition information in the communication condition storing means.

6. A management server which manages a communication condition of each of a plurality of communication terminals performing cryptographic communication, comprising:
communication condition storing means which stores, for each of the plurality of communication terminals, a terminal ID of the communication terminal and an algorithm ID of each cryptographic algorithm respectively used for each of a plurality of encryption/decryption processing means provided for the communication terminal;
common condition request receiving means which receives a common condition request containing a terminal ID of a communication source terminal and a terminal ID of a communication destination terminal;
common condition search means which searches the communication condition storing means for an algorithm ID contained in both the communication condition information containing the terminal ID of the communication source terminal and the communication condition information containing the terminal ID of the communication destination terminal;
key generation information generating means which generates plural pieces of key generation information, each containing a key used in the encryption/decryption processing means for the cryptographic algorithm having the algorithm ID retrieved by the search by the common condition search means, or a key type for generating the key, and a key ID corresponding to identification information; and common condition transmitting means which transmits common condition information to each of the source and destination communication terminals, the common condition information containing the terminal ID of the communication source terminal and the terminal ID of the communication destination terminal of the common condition request received by the common condition request receiving means, the algorithm ID retrieved by the search by the common condition search means, and the plural pieces of key generation information generated by the key generation information generating means in response to the common condition request, wherein:

the common condition request contains representation of a period of communication between the source and destination terminals;

the key generation information generating means generates n pieces of key generation information such that a validity period of the first key starts not later than the communication period, a validity period of the n-th key ends not before the communication period, and a validity period of an i-th key ($2 \leq i \leq n$) starts not after the end of a validity period of the (i−1)-th key to enable the cryptographic communication means of each of the source and destination terminals to select or change the key generation information in accordance with the validity period.

7. A communication terminal which performs cryptographic communication, comprising:

a plurality of encryption/decryption processing means using different cryptographic algorithms;

common condition requesting means which transmits a common condition request to a management server, the common condition request containing a terminal ID the communication terminal when acting as a source and a terminal ID of another communication terminal as a communication destination;

common condition storing means which stores common condition information containing a terminal ID of a counterpart source or destination terminal, an algorithm ID corresponding to identification information of the cryptographic algorithm that can be used by both the terminal itself and the counterpart terminal, and plural pieces of key generation information each containing one of a key and a key type for generating the key, and a key ID corresponding to identification information;

common condition obtaining means which receives the common condition information from the management server and stores the received common condition information in the common condition storing means, the common condition information containing the terminal ID of the communication terminal itself and the terminal ID of the counterpart terminal; and cryptographic communication means which searches the common condition storing means for the common condition information having a terminal ID of a communication counterpart terminal, selects, from the plurality of encryption/decryption processing means, the encryption/decryption processing means, for the cryptographic algorithm having the algorithm ID contained in the common condition information found in the search, and uses the selected encryption/decryption processing means to perform the cryptographic communication with the communication counterpart terminal, wherein:

when the terminal is acting as the source, the cryptographic communication means of the communication terminal selects key generation information from the plural pieces of key generation information contained in the common condition information retrieved by the search, uses the key contained in the selected key generation information or the key generated from the key type contained in the key generation information to cause the selected encryption/decryption processing means to generate encrypted data, and transmits cryptographic communication information containing the encrypted data and the key ID contained in the selected key generation information to the communication counterpart terminal;

when the terminal is acting as the destination, the cryptographic communication means selects key generation information having a key ID contained in cryptographic communication information received from the communication counterpart from the plural pieces of key generation information contained in the common condition information retrieved by the search and uses the key contained in the selected key generation information or the key generated from the key type contained in the key generation information to cause the selected encryption/decryption processing means to decrypt the encrypted data contained in the cryptographic communication information received from the communication counterpart;

the common condition request transmitted by the communication terminal contains a communication period representing a period of communication with the communication counterpart;

the plural pieces of key generation information generating include n pieces of key generation information such that a validity period of the first key starts not later than the communication period, a validity period of the n-th key ends not before the communication period, and a validity period of an i-th key ($2 \leq i \leq n$) starts not after the end of a validity period of the (i−1)-th key; and the cryptographic communication means selects or changes the key generation information in accordance with the validity period.

8. A communication condition management method which allows a management server to manage a communication condition of each of a plurality of communication terminals performing cryptographic communication, the management server comprising communication condition storing means which stores, for each of the plurality of communication terminals, communication condition information containing a terminal ID of the communication terminal and an algorithm ID of each of a plurality of cryptographic algorithms used respectively for a plurality of encryption/decryption processing means provided for the communication terminal, the communication condition management method comprising the steps of:

receiving a common condition request containing a terminal ID of a communication source terminal and a terminal ID of a communication destination terminal from the communication source terminal;

searching the communication condition storing means for an algorithm ID contained in both the communication condition information containing the terminal ID of the communication source terminal and the communication condition information containing the terminal ID of the communication destination terminal;

generating plural pieces of key generation information, each containing a key used in the encryption/decryption processing means for the cryptographic algorithm having the algorithm ID retrieved by the search, or a key type for generating the key, and a key ID corresponding to identification information; and transmitting common condition information to each of the communication terminals, the common condition information containing the terminal ID of the communication source terminal and the terminal ID of the communication destination terminal of the received common condition request, the algorithm ID retrieved by the communication condition search, and the plural pieces of key generation information generated in response to the common condition request, wherein:

the common condition request transmitted by the communication source terminal contains a representation of a period for communication with the communication destination terminal;

the plural pieces of key generation information include n pieces of key generation information such that a validity period of the first key starts not later than the communication period, a validity period of the n-th key ends not before the communication period, and a validity period of an i-th key ($2 \leq i \leq n$) starts not after the end of a validity period of the (i−1)-th key, to enable cryptographic communication means of each of the source and destination terminals to select or change the key generation information in accordance with the validity period.

9. A cryptographic communication method which allows a communication terminal to perform cryptographic communication, the communication terminal comprising a plurality of encryption/decryption processing means using different cryptographic algorithms and storage means, the cryptographic communication method comprising the steps of:

transmitting a common condition request to a management server, the common condition request containing a terminal ID of the communication terminal when acting as a source and a terminal ID of another communication terminal as a communication destination terminal;

receiving common condition information containing a terminal ID of the communication terminal itself, the terminal ID of the communication destination terminal, an algorithm ID corresponding to identification information of a cryptographic algorithm that can be used by both the communication source terminal and the communication destination terminal, from the management server, and storing the common condition information in the storage means; and searching the storage means for the common condition information having a terminal ID of a communication counterpart, selecting, from the plurality of encryption/decryption processing means, the encryption/decryption processing means for the cryptographic algorithm having the algorithm ID contained in the common condition information found in the search, and performing cryptographic communication with the communication terminal of the communication counterpart by using the selected encryption/decryption processing means, wherein:

when the terminal is acting as the source, the step of performing the cryptographic communication comprises selecting key generation information from the plural pieces of key generation information contained in the common condition information retrieved by the search, uses the key contained in the selected key generation information or a key generated from the key type contained in the key generation information, to cause the selected encryption/decryption processing means to generate encrypted data, and transmits cryptographic communication information containing the encrypted data and the key ID contained in the selected key generation information to the communication counterpart;

while the terminal is acting as the destination, the step of performing cryptographic communication comprises selecting key generation information having a key ID contained in cryptographic communication information received from the communication counterpart from the plural pieces of key generation information contained in the common condition information retrieved by the search, and causing the selected encryption/decryption processing means to decrypt the encrypted data contained in the cryptographic communication information received from the communication counterpart by using the key contained in the selected key generation information or the key generated from the key type contained in the selected key generation information;

the common condition request contains a communication period representing a period of communication with the communication counterpart;

the plural pieces of key generation information generating include n pieces of key generation information such that a validity period of the first key starts not later than the communication period, a validity period of the n-th key ends not before the communication period, and a validity period of an i-th key ($2 \leq i \leq n$) starts not after the end of a validity period of the (i−1)-th key; and the cryptographic communication step further comprises selecting or changing the key generation information in accordance with the validity period.

* * * * *

UNITED STATES PATENT AND TRADEMARK OFFICE
CERTIFICATE OF CORRECTION

| | | |
|---|---|---|
| PATENT NO. | : 7,697,692 B2 | Page 1 of 1 |
| APPLICATION NO. | : 11/363510 | |
| DATED | : April 13, 2010 | |
| INVENTOR(S) | : Osamu Takata et al. | |

It is certified that error appears in the above-identified patent and that said Letters Patent is hereby corrected as shown below:

IN THE CLAIMS:

In Column 27, Line 1, (Claim 2) change "for which" to --which uses--.

In Column 27, Line 14, (Claim 2) change "for which" to --which uses--.

In Column 30, Line 35, (Claim 7) delete the word "generating".

In Column 32, Line 40, (Claim 9) delete the word "generating".

Signed and Sealed this
Second Day of October, 2012

David J. Kappos
*Director of the United States Patent and Trademark Office*